(12) United States Patent
Coutts et al.

(10) Patent No.: US 8,811,934 B2
(45) Date of Patent: Aug. 19, 2014

(54) COMMUNICATIONS DEVICE, SYSTEM AND METHOD

(75) Inventors: Reginald Paul Coutts, Hahndorf (AU); Norman William McLeod, Glen Iris (AU)

(73) Assignee: Red Button Technologies Pty Ltd, Adelaide, South Australia (AU)

( * ) Notice: Subject to any disclaimer, the term of this patent is extended or adjusted under 35 U.S.C. 154(b) by 274 days.

(21) Appl. No.: 12/677,925

(22) PCT Filed: Sep. 12, 2008

(86) PCT No.: PCT/AU2008/001358
§ 371 (c)(1),
(2), (4) Date: Jul. 22, 2010

(87) PCT Pub. No.: WO2009/033228
PCT Pub. Date: Mar. 19, 2009

(65) Prior Publication Data
US 2011/0003601 A1    Jan. 6, 2011

(30) Foreign Application Priority Data
Sep. 14, 2007 (AU) ................. 2007905048

(51) Int. Cl.
*H04M 11/04* (2006.01)
*G08B 21/04* (2006.01)
*G08B 25/00* (2006.01)
*G08B 25/01* (2006.01)

(52) U.S. Cl.
CPC .......... *G08B 25/016* (2013.01); *G08B 21/0446* (2013.01); *G08B 25/004* (2013.01); *H04M 11/04* (2013.01); *G08B 25/005* (2013.01); *G08B 21/0415* (2013.01)
USPC .......... 455/404.1; 455/404.2; 379/37; 379/38

(58) Field of Classification Search
CPC ................................................ H04W 76/007
USPC ...................................................... 455/404.1
See application file for complete search history.

(56) References Cited

U.S. PATENT DOCUMENTS 5,714,931 A     2/1998  Petite et al.
6,807,564 B1 * 10/2004  Zellner et al. ................. 709/206
7,126,472 B2 * 10/2006  Kraus et al. ............... 340/539.18

OTHER PUBLICATIONS

PCT/AU2008/001358 International Search Report.

* cited by examiner

*Primary Examiner* — Huy C Ho
(74) *Attorney, Agent, or Firm* — Michael Best & Friedrich LLP

(57) ABSTRACT

A system for communicating an alert message from a user to a recipient is disclosed. In one embodiment the system includes a communications network, a communication device, and a communications management system. The communications device is activatable by the user to transmit into the communications network a signal communicating identification information associated with the user. The communication management receives and processes the signal to establish a communications channel between the communications device and a communications service associated with a recipient. The communications service is selected according to the identification information. Method and devices for communicating an alert signal are also disclosed.

22 Claims, 15 Drawing Sheets

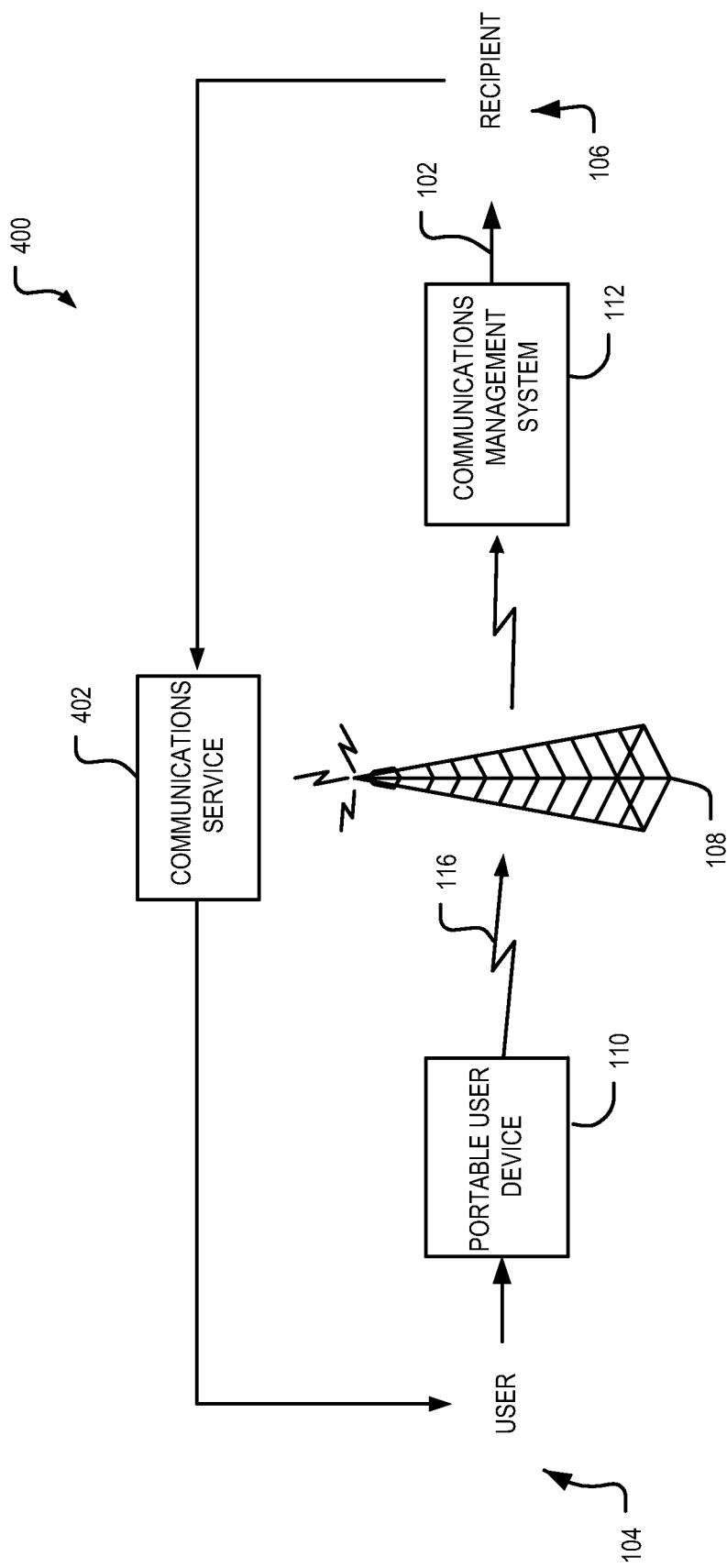

| A-Number | 0418 222 333 |
| Password | ****** |
| Home MSA | 123 |
| | |
| | |
| Response – 0 | 000 |
| Response – 1 | Doctor |
| Response – 2 | Other |

FIG.8

| Person | Number | Sequence | Duration | Email address |
|---|---|---|---|---|
| Tom | 0418 333 444 | 1 | 10 | email |
| Dick | 0438 444 555 | x | 15 | email |
| Harry | 0428 555 666 | x | 10 | email |
| Fred | 0408 666 777 | 2 | 10 | |
| Mary | 035 623 9971 | 3 | 20 | |
| | | | | |
| Emergency | 000 | Final | | |

FIG.9A

COMMUNICATIONS DEVICE, SYSTEM AND METHOD

This international patent application claims priority from Australian provisional patent application number 2007905048 filed on 14 Sep. 2007 the contents of which are to be taken as incorporated herein by this reference.

FIELD OF INVENTION

The present invention relates to a device, system and method for communicating an electronic message between a sender of a communication signal and a recipient. In a typical application, the message may be an alert message which is communicated from a sender (or user), who may be an elderly person, to a recipient, who may be a person who is caring for the elderly person.

BACKGROUND TO THE INVENTION

Various systems are known for allowing a person to communicate an electronic message with another person via a communications path or channel. Such systems may be used, for example, to communicate an alert message from a message sender to a recipient. Such an alert message may be required when, for example, a person requires medical assistance (for example, as a result of an injury), or perhaps has health or security concerns.

One system for establishing a communications channel suitable for communicating an alert message involves a user wearing a portable device, such as a pendant, that includes an "emergency call button" for activating a short range radio frequency (RF) transmitter. On activation of the "call button" the portable device transmits a signal to a local receiver unit (or 'base station') that is hard-wired to a public switched telephone network. The receiver unit typically includes a microphone and speaker.

On receipt of the signal transmission from the portable device, the receiver unit automatically dials a pre-programmed communications service, which may be an emergency or monitoring service, via the PSTN. Once the call is connected, the recipient may receive a preprogrammed message or, in some cases, may be able to establish a 2-way voice channel with the recipient using the microphone and speaker provided with the receiver unit.

In systems of this type, each portable device has a unique association with a particular receiver unit (or 'base station') such that a receiver unit is pre-programmed to respond to signal transmissions originating only from the associated portable user device. Consequently, in order to establish a communications path with a recipient, the portable device must be located sufficiently close to the receiver unit (which is usually a fixed position unit) so as to allow the portable device to communicate with the local receiver. In addition, to be effective, the wearer must remain within range of the receiver unit.

In view of the above, such systems typically have limited flexibility in operation since the receiver unit is unable to communicate with other than the uniquely associated portable device, and thus is unable to act on transmissions from other portable devices. Furthermore, even in systems which support voice channel communication between the wearer and the recipient, that support is restricted to a 2-way communications channel.

Further techniques for establishing communication links suitable for communicating an alert message have been developed using public land mobile network based communication systems. Indeed, existing mobile phone technology may devices may also be used to establish a communications link between a user and a recipient for communicating an alert message, such as via a conventional mobile call or SMS message. Mobile phone based systems provide wider coverage that systems of the type described above. However, the operation and suitability of mobile phone devices for communicating an alert message is somewhat limited to the extent that, in an emergency situation, using a conventional mobile phone and PLMN system to communicate an alert message may introduce undesirable delays in communicating the alert message to a recipient. In addition, in circumstances, for example, where a recipient is a 'guardian' (such as a parent) of the mobile phone user (such as a child or an elderly person), the guardian cannot modify their contact details stored in user's mobile phone to account for a temporary or permanent change in those details, without having access to the phone or by informing the user to modify the recipient's contact details.

It would be desirable to provide a communications system that was flexible in its operation so as to be easily configurable by either the user or the intended recipient of a communications message, such as an alert message, via a communications channel.

The discussion of the background to the invention herein is included to explain the context of the invention. This is not to be taken as an admission that any of the material referred to was published, known or part of the common general knowledge as at the priority date of this application.

SUMMARY OF THE INVENTION

With the above in mind, in one aspect the present invention provides a system for communicating an alert message from a user to a recipient, including:

a wireless communications network;

a portable user device, to be worn or carried by the user, the device including a wireless transmitter that can be activated to transmit a communication signal into the wireless communications network; and a communications management system for receiving the communication signal via at least the wireless communications network and thereafter establishing a communication link with a selected recipient via a communications service associated with the selected recipient to communicate the alert message;

wherein the communications management system selects the recipient according to configuration information provided to the communications management system prior to the transmission of the communication signal.

The present invention also provides a system for communicating an alert message from a user to a recipient, including:

a wireless communications network;

a portable user device, to be worn or carried by the user, the device including a wireless transmitter that can be activated to transmit a communication signal into the wireless communications network, and means for switching mode of the portable user device between a first mode and a second mode so that in the first mode the communication signal contains information for identifying a first communications service associated with the user and in the second mode the communication signal contains identification information for identifying a second communications service associated with the user; and a communications management system for receiving the communication signal via at least the wireless communications network and thereafter establishing a communication link with a selected recipient via a communications service associated with the selected recipient to communicate the alert message, the alert message identifying the communications service identified by the communication signal;

wherein the communications management system selects the selected recipient or the communications service associated therewith according to configuration information provided to the communications management system prior to the transmission of the communication signal.

The present invention also provides a system for communicating an alert message from a user to a recipient, including:
a wireless communications network;
a portable user device, to be worn or carried by the user, the device including a wireless transmitter that can be activated to transmit a communication signal into the wireless communications network; and
a communications management system for receiving the communication signal via at least the wireless communications network and thereafter establishing a communication link with a selected communications service to communicate the alert message;
wherein the communications management system selects the communications service according to configuration information provided to the communications management system prior to the transmission of the communication signal.

The present invention also provides a portable user device, to be worn or carried by the user, for communicating a communication signal, the device including:
a wireless transmitter that can be activated to transmit a communication signal into a wireless communications network; and
means for switching mode of the portable user device between a first mode and a second mode so that in the first mode the communication signal contains information for identifying a first communications service associated with the user and in the second mode the communication signal contains identification information for identifying a second communications service associated with the user.

The present invention also provides a method of communicating an alert message from a user to a recipient, including:
a user activating a portable user device to transmit a communication signal into a wireless communications network; and
a communications management system receiving the communication signal via at least the wireless communications network and thereafter establishing a communications channel with a recipient selected by the communications management system via a communications service associated with that recipient to communicate the alert message;
wherein the communications management system selects the recipient or a communications service associated with the recipient, according to configuration information provided to the communications management system prior to the transmission of the communication signal.

The present invention also provides a system for communicating an alert message from a user to a recipient, the system including:
a communications network;
a communication device which is activatable by the user to transmit into the communications network a signal communicating identification information associated with the user; and
a communications management system for receiving and processing the signal to establish a communications channel between the communications device and a communications service associated with the recipient, the communications service being selected according to the identification information, being the communications channel for communicating the alert message.

The present invention also provides a system for communicating an alert message from a user to a recipient, the system including:
a communications network;
a communication device which is activatable by the user to transmit into the communications network a signal communicating identification information associated with the user; and
a communications management system including:
a communications network interface for receiving the signal via the communications network;
a communications controller for processing received identification information to select a first communications service, the first communications service being associated with the recipient, and establishing a communications channel between the communications device and the first communications service, being the communications channel for communicating the alert message; and
a signal detecting means for detecting, after the communications channel has been established, a further communication signal containing signaling information, wherein the signaling information includes information which is decodable by the communications management system as a request to extend the communication channel to a second communications service, the second communications service being associated with another recipient;
wherein in response to detecting the further communication signal, the communications management system processes the signaling information to select the second communications service and extends the communications channel to include the second communications service without disrupting the communication link between the communication device and the first communications service.

The present invention also provides a communications management system for handling an alert message for communication from a user to a recipient, the communications management system including:
a communications network interface for interfacing with a communications network, the interface for receiving a signal transmitted into the communications network by a communications device activated by the user, the signal communicating identification information associated with the user;
a communications controller for processing received identification information to select a communications service associated with the recipient and establishing a communications channel with the selected recipient communications service to communicate the alert message.

The present invention also provides a communications management system for handling an alert message for communication from a user to a recipient, the communications management system including:
a communications network interface for receiving a signal via a communication network, the signal being transmitted into the communications network by a communication device activated by the user, the signal communicating identification information associated with the user;
a communications controller for:
processing received identification information to select a first communications service, the first communications service being associated with the recipient; and
establishing a communications channel between the communications device and the first communications service, being the communications channel for communicating the alert message; and a signal detecting means for detecting, after the communications channel has been established, a further communication signal containing signaling information, wherein the signaling information includes information which is decodable by the communications management system as a request to extend the communication channel to a second communications service, the second communications service being associated with another recipient;

wherein in response to detecting the further communication signal, the communications controller processes the signaling information to select the second communications service and the communications controller extends the communications channel to include the second communications service without disrupting the communication link between the communication device and the first communications service.

The present invention also provides a method of communicating an alert message from a user to a recipient, the method including:

the user activating a user device to transmit into a communications network a signal communicating identification information associated with the user; and receiving and processing the signal to establish a communications channel between the user device and a recipient communications service associated with the recipient, the recipient communications service being selected according to a predefined association between the identification information and one or more recipient communications services, being the communications channel for communicating the alert message.

The present invention also provides a method of activating a three way communications channel in response to communication of an alert message from a user to a recipient, the method including:

activating a user device to transmit into a communications network a signal communicating identification information associated with a user;

receiving and processing the signal to establish a communications channel between the user device and a first recipient communications service associated with the recipient, being the communications channel for communicating the alert message;

generating on the communications channel a further signal containing signaling information requesting that the communications channel be extended to a second recipient communications service associated with a second recipient;

decoding the signaling information to select the second recipient communications service having a predefined association with the identification information; and extending the communications channel to include the second recipient communications service without disrupting the communication link between the user device and the first recipient communications service.

GENERAL DESCRIPTION OF THE INVENTION

The present invention involves a system for managing communication of an alert message between a user (that is, the initiator of the message) operating a communications device and a recipient communications service, via a communications network.

The communications network may include any suitable communications network or combinations of networks which support data or voice communications. Examples of suitable communications networks include, for example a public switched telephone network (PSTN), a public land mobile network (PLMN), and internet packet (IP) protocol based communications networks (such as an IP network which supports VOIP communication).

The communication device may include a wireless or wired communication device which is compatible for communication with the communications network using a communications service provided by that network. Suitable communication devices may include, for example, a PSTN compatible communication device (such as a telephone), a PLMN compatible communication device (such as a GSM mobile phone), or an IP based communication device (such as a VOIP device). Suitable IP based communication devices may include a portable or desktop computer, a personal digital assistant (PDA), a mobile phone which supports packet switched data communication, a Bluetooth enabled communications device, a Wi-Fi compatible device or the like. Preferably, the communication device is a portable wireless communication device. However, the present invention is equally applicable to wired communications devices.

Activating the communication device to transmit a signal into the communications network may entail the user activating the device to establish a first communications channel between the communication device and the communications management system using a first communications service supported by the communications network. The first communications channel may then be redirected or extended to a selected recipient communications service based on identification information for the first communications service, to thereby establish the communications channel between the communications device and the selected communications service. In such an embodiment, the first communications service may be a service which is assigned to the user, and thus the identification information for the first communications service will be associated with the user. By way of example, the first communications service may include a mobile telephone service having a telephone number which has been assigned to the user by a communications service provider, in which case the telephone number may serve as the identification information. Other examples of communication services include a VOIP (Voice Over Internet Protocol) service, an Short Message Service (SMS) messaging service, an email service, an electronic messaging service or the like.

A user communication device may include a control, such as a switch, a "hot-key", a button or the like which is operable by the user to transmit the signal into the communications network. The control may be a "hard" control, such as a physical switch, keypad, or button, or touch-pad. Alternatively, the control may be a "soft" control involving, for example, a graphical user interface displaying icons which can be activated using a suitable interface device, such as a keyboard, mouse, touch-screen, joystick or the like. Alternatively, in some embodiments the control may be a voice activated control which is responsive to predefined voice commands from the user, in which case the user communication device may include suitable audio interface devices and drivers. For example, a simple voice command may include "Help Help".

Preferably, operating the control involves a simple action on the part of the user. For example, in an embodiment which includes a PSTN or PLMN communications network, activation of the communication device may entail the user operating a pre-programmed switch or button on the communication device to 'dial' a preprogrammed telephone number associated with the communications management system. By providing a pre-programmed control which involves a simple action on the part of the user it may be possible to simplify the actions required by the user to activate the device, which may be important in a situation in which the user is under stress.

The identification information may include a unique identifier which identifies user, or the communication device, or a communications service associated with the device, and thus the user. In an embodiment in which the communications network is a PLMN or PSTN communications network, the unique identifier may include the caller line identification (CLI) for that service. However, other types of communication networks may provide communications services which are configured to communicate other types of data or information which also provide a suitable identifier for the communications service associated with the user, the communications device, or for the user. By way of example, in an IP based communications network, the IP address of the communication device may provide a unique identifier for a VOIP communications service.

A communication device may be preprogrammed, configured or coded with a unique identifier which is associated with the user, or the device (such as, for example, a device serial number) and which is encoded onto the communication signal as the identification information on activation of the communication device for communication of the signal. Alternatively, the identification information may be a unique identifier which is entered into the device or input by the user. For example, the user may enter a code sequence, using a keypad or the like, which is indicative of the unique identifier. As will be explained in more detail later, it is preferred that the association between the identification information and the user be stored in relational databases accessible to the communications management system so as to enable identification of the user activating the communications device.

In view of the above, it will be appreciated that the identification information will include any information which is capable of uniquely identifying the communications service, or the communication device, or the user.

A communications management system in accordance with an embodiment preferably allows the user or a recipient(s) to supply by means of an interactive selection, or an upload process, configuration information for use by the communications management system to establish the communications channel with a recipient communications service based on the identification information associated with the user.

In one embodiment, the user or a recipient(s) may also be able to enter configuration information in the form of, for example, rules, logic or ancillary information, for controlling the selection of the recipient communications service according to the identification information associated with the user. Preferably, the communications management system establishes sufficient associations between the user, one or more recipients and other necessary information to enable the communications management system to perform operational functions including, inter-alia and in particular, selecting a recipient communications service for establishing an "active" communications link for receiving the alert message. As will be described in more detail later, an "active" communications link is a communications link which permits two-way communication. In this respect, the communications management system preferably stores the relevant information and associations in a suitable database, or databases.

Preferably, the communications management system will be a computerised system which may include one or more networked computers or computing devices with sufficient aggregate processing power and storage capacity to operate required application software, databases and support software. In this respect, the communications management system may also provide sufficient aggregate storage for required information and sufficient network connectivity to allow an alert message(s) to be communicated to one or more selected recipient communications services in accordance with configuration information entered for a particular user.

A communications management system need not be implemented on dedicated hardware. Indeed, a communications management system may be implemented on hardware which also implements other communications system functions. Further, a communications management system may share other resources such as software resources with other communications system functionality.

A communications management system may be a distributed entity. In this respect, functional modules (such as software and hardware modules) that form a part of a communications management system may not be physically co-located, but rather may be located in multiple locations and communicate with each other by means of data links, communications network(s) or communications inter-networks as required to carry out their respective role or roles.

The precise capabilities of a particular communications management system may depend somewhat on the scope, objectives and manner of implementation of the system. In this respect, a particular communications management system design may support particular processes which facilitate the inventive method.

It may be possible to integrate the communications management system with the communications network's infrastructure, such as an infrastructure of a telecommunication carrier's intelligent network (IN). Indeed, a communications management system may be implemented in part or entirely as an Intelligent Network application or application suite and makes use of standards based or proprietary Intelligent Network precepts, architectures, protocols and capabilities such as the AIN or ITU-T families of Intelligent Network standards.

Alternatively, the communications management system may include modules which are implemented 'outside' the carrier's network but connected thereto. For example, a communications management system may include a communications controller, such as a connectivity server, which interfaces with communications infrastructure of the communications network, but which is operated independently of the network.

A communications management system that interfaces with communications infrastructure of a communications network may include a communications network interface for interfacing with the communications network to receive the signal transmitted into the communications network by the communications device, a processing means for processing received identification information to select the communications service associated with a recipient, and a communications controller for establishing the communications channel with the selected recipient communications service to communicate the alert message.

The selection of the recipient communications service may involve indexing the identification information into a database containing data structures relating the identification information to one or more recipient communications services or other functional operations. Thus, a communications management system may include, or have access to, a database which includes information which is configurable by a user or a recipient to relate the identification information with one or more recipient communications services or other functional operations.

Preferably, configuration of communications management system involves a user or a recipient interacting with the communications management system using an interactive medium, such as via a computing device connected to the Internet or a suitably equipped communications device.

Interaction with the communications management system may be subject to the communications management system performing suitable identification processes to authenticate the identity of a user or a recipient. In this respect, the communications management system will preferably perform an authentication process, or processes, to verify whether or not a user or recipient is authorised to carry out the functions they seek to carry out.

The authentication process may include interaction with a database, or databases, associated with a specified user communications service(s) and/or user communications device. In one embodiment a communications management system is able to interact with a database, or databases, owned or controlled by another entity, or entities, such as a telephone company or Internet service provider or communications service provider or some other service provider for the purpose of authentication Pursuant to one embodiment, once access to the communications management system has been established, a user or recipient is able to enter or select, by means of some interactive selection process, or by some other suitable means, configuration information which is subsequently used by the communications management system to establish a communications channel with a selected recipient communications service or activate other services.

A recipient communication service may include any communications service which is capable of communicating the alert message, such as:

a. a PSTN service;
b. a PLMN service;
c. a text messaging service;
d. a short message service (SMS); or
e. a packet based communications service.

The recipient communications service may be selected from a group or set of possible recipient communications services which the configuration information identifies as having an predefined association with the identification information of the user. A group or set of recipient communications services may include, for example, PSTN or PLMN communications services associated with recipients which are known to the user, such as friends or family members of the user. Hence, the group or set of recipient communications services may include recipient communications services associated with recipients which have been designated to receive the alert message.

As described above, a communications management system in accordance with an embodiment may also provide a user or a recipient with the ability to establish configuration information, such as rules or logic or ancillary information, for selecting a recipient communications service from a group or set of possible recipient communications services associated with the identification information of the user. It is also possible that a communications management system in accordance with an embodiment may allow a user or a recipient to supply by means of an interactive selection, or upload process configuration information, such as rules or logic or ancillary information, for use by the communications management system to assist it in determining circumstances under which a further message should be communicated to a different recipient communications service of the group or set, or when the communication channel should be extended so that the communication channel includes three parties.

In view of the foregoing, a database may be configured to provide a data structure including configuration information defining rules or logic for selecting which of the plural recipient communications services, and thus which of the recipients, is to receive the alert message, or to manage further communication with a different recipient communications services once the communications channel has been established. The processing of the configuration information may occur during set-up of the communications channel, or after the communications channel has been established.

In terms of processing configuration information to establish the communications channel, the configuration information may define, for example, an order which is representative of a sequence in which the communication management service is to select the recipient communications service associated with the identification information. In such an embodiment, for example, in the event that the communications management system is unable to establish a communication channel with a first recipient communications services in the order or list, the system will then attempt to establish a communication link with a second recipient communications service, and so on, according to the predefined sequence.

With the above in mind, a communications management system in accordance with an embodiment may include means for detecting when an 'active' communications link cannot be established with a recipient and for automatically selecting another recipient communications service in accordance with the predefined sequence.

In this respect, references to the term 'active' communications link throughout this specification are to be understood to denote a communications link which supports substantially immediate two-way communication between the user and the recipient. Hence, for example, a communications management system may include means for detecting when an active communications link has not been established within a predetermined period. In another embodiment, the communications management system includes means for preventing a communication channel being established with a recipient communications service that involves a second diversion. Communicating the alert message to an 'active' communication link may improve the response time to the alert message.

As briefly described above, a communications management system in accordance with an embodiment may also include means for extending the communication channel to a third party in response to the activation of a further signal into a communications network. The further signal may be a user activated signal or a recipient activated signal. Thus, an embodiment of the system may be able to set-up a communication channel which includes the user, the recipient and a third party, based on a request generated by the user or the recipient operating their respective communication devices involved in the communications channel.

In a preferred embodiment the communication channel is extended to the third party without disrupting the communication link between the user communications service and the recipient communications service. In other words, an embodiment of the communications management system may be able to invoke a communications link with a third party whilst simultaneously maintaining a communication link between the user and the recipient over the same communications channel. In this way, communications between the user and the recipient may continue whilst the communications channel is being extended. Such a system is expected to provide advantages in that it may allow both the user and the recipient to simultaneously monitor the progress of the connection to the third party.

The further signal may contain signaling information which is processed by the communications management system to select a third party communications service according to configuration information, such as, rules, logic or ancillary information defining a predefined association between the signaling information and the third party communication service. Thus, processing the further signal may involve indexing the signaling information into a data structure relating signaling information with communications services associated with third parties. The third party communications services may include the group recipient communications services associated with the identification information.

In the case of a PSTN or PLMN communications network, the signaling information may include, for example, a DTMF signal corresponding with a button press (or a sequence of button presses) on the keypad of a conventional phone.

A communications management system in accordance with an embodiment may also include means for causing communication of a further message to one or more other communications services. The further message may include any suitable type of message, such as, for example, an SMS message, an email message, an electronic message service message, a voice message or the like.

The other communications services may include the recipient communications services associated with the identification information. The communication of the further message may be invoked by the communications management system either on receipt of the signal containing the identification information for the user, or in response to the further signaling information from either the recipient or the user of the type explained previously.

In an embodiment, the further message may be automatically communicated to all recipient communications services associated with the identification information to indicate, for example, that the user device has been activated and an alert message has been communicated to a selected recipient. In an alternative embodiment, the further message may be communicated to selected ones of the recipient communications services. In either case, the further message may include information identifying the recipient communications service which selected to receive the alert message so that on receipt of the further message the other recipient(s) are able to ascertain who is acting on, or handling, the alert message.

Communication of the further message to one or more other recipient communications services may be triggered in response to an action of the recipient of the alert message. By way of example, the recipient of the alert message may activate a communication device to cause the communications management system to communicate a further message indicating the status of the response to the alert message.

A suitable action may include, for example, the recipient activating the communication device which received the alert message to generate a signal onto the communications channel which is decodable by the communication management system as a request to communicate a further message. The communications management system preferably references the decoded information into a database containing configuration information which identifies the type and nature of the further message associated with the decoded information and then arranges communication of the further message to one or more other recipient communications service(s).

Embodiments of the present invention may provide a system, device and method having an improved range and operational flexibility. It is envisaged that the system will provide a tightly managed communications gateway between a user and a recipient. The user may be an elderly person requiring a tightly managed communications gateway with friend or family member for use in emergency situations. Alternatively, the user may be a child with which a parent requires a tightly managed communications gateway.

BRIEF DESCRIPTION OF THE DRAWINGS

The invention will now be described in further detail by reference to the attached drawings. However, it must be appreciated that the following description is not to limit the generality of the above description.

In the drawings:

FIG. 4A is a block diagram of second embodiment of a system for communicating according to the present invention;

FIG. 8, FIG. 9A and FIG. 9B are tables illustrating further examples of configuration information that may be provided to a communications management system by a user or the recipient;

DETAILED DESCRIPTION OF AN EMBODIMENT

Figure 1:
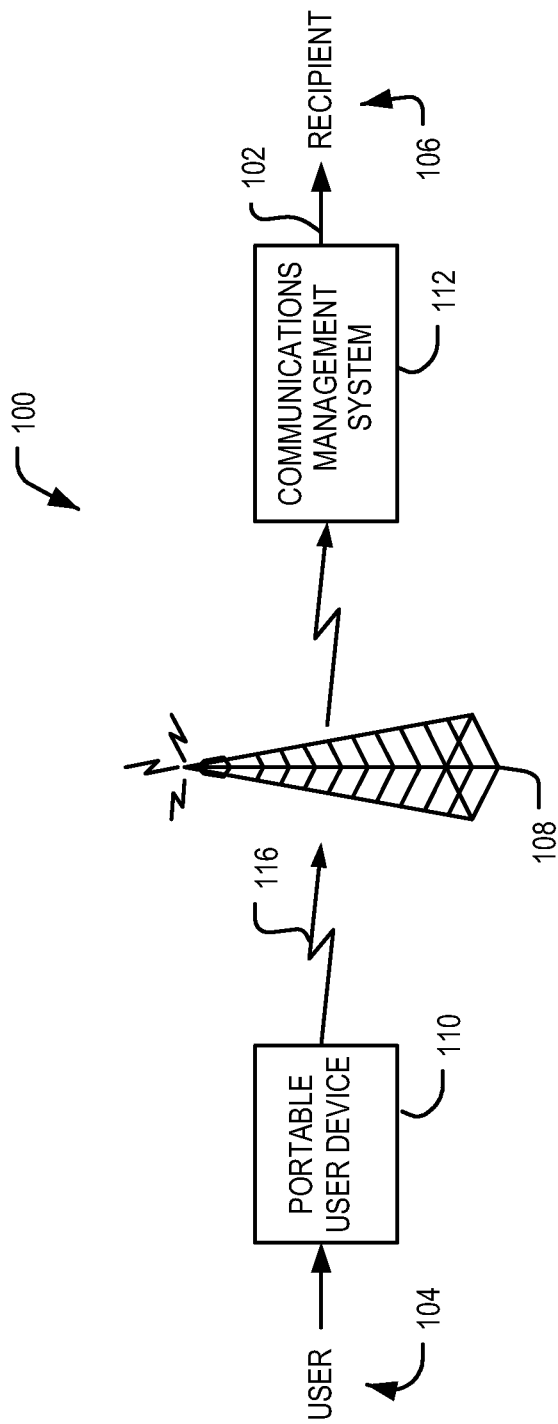
FIG. 1 is a simplified block diagram of a system for communicating an alert message according to an embodiment of the present invention.

FIG. 1 illustrates an embodiment of a system 100 for establishing a communications channel suitable for communicating an alert message 102 from a user 104 to a recipient 106. As shown, the system 100 includes a communication network 108, a communication device 110, and a communications management system 112. As will be described in more detail later, the communications device 110 is activatable by the user 104 to transmit into the communication network 108 a signal 116 which communicates identification information associated with the user 104. The communications management system 112 receives the signal 116 via the communications network 108 and processes received identification information to select a communications service associated with a recipient 106. The communications management system then establishes a communications channel with the selected recipient communications service to communicate the alert message 102 to the recipient 106.

In the present case, the system 100 communicates an alert message 102 in the form of an electronic message comprising, for example, a text message, an email message, or voice communication. In the illustrated embodiment the communications network 108 is depicted as a wireless communications network. However, it is to be appreciated that a wired communications network may be used.

The wireless communications network 108 may be any type of suitable network and may include, for example, a public land mobile network (for example, a GSM, CDMA PLMN network), a wide area wireless packet based communications network (for example, a general packet radio system (GPRS) network or a high-speed downlink packet access network (HSDPA) network), or a local area wireless computer network (for example a IEEE 802.11 "Wi-Fi" network), or a combination of different types of wireless communications networks. However, in a typical application it is envisaged that the wireless communications network 108 will include a GSM public land mobile network (PLMN). Accordingly, for the purposes of this description the wireless communications network 108 will be described in terms of a GSM public land mobile network. However, it is to be appreciated that the system 100 need not be so limited and that other types of wireless communications networks 108 may be deployed without departing from the scope of the present invention.

Typically the communications device 110 will be a portable wireless user device which is adapted to be worn or carried by the user 104. Such a device may have any suitable configuration but, ideally, will be relatively small in size, low weight and robust. It is possible that the portable user device 110 may be a mobile phone, or an application specific device such as a pedant that is wearable around the neck of the user and that is sealed so as to reduce susceptibility to moisture ingress.

Figure 2A:
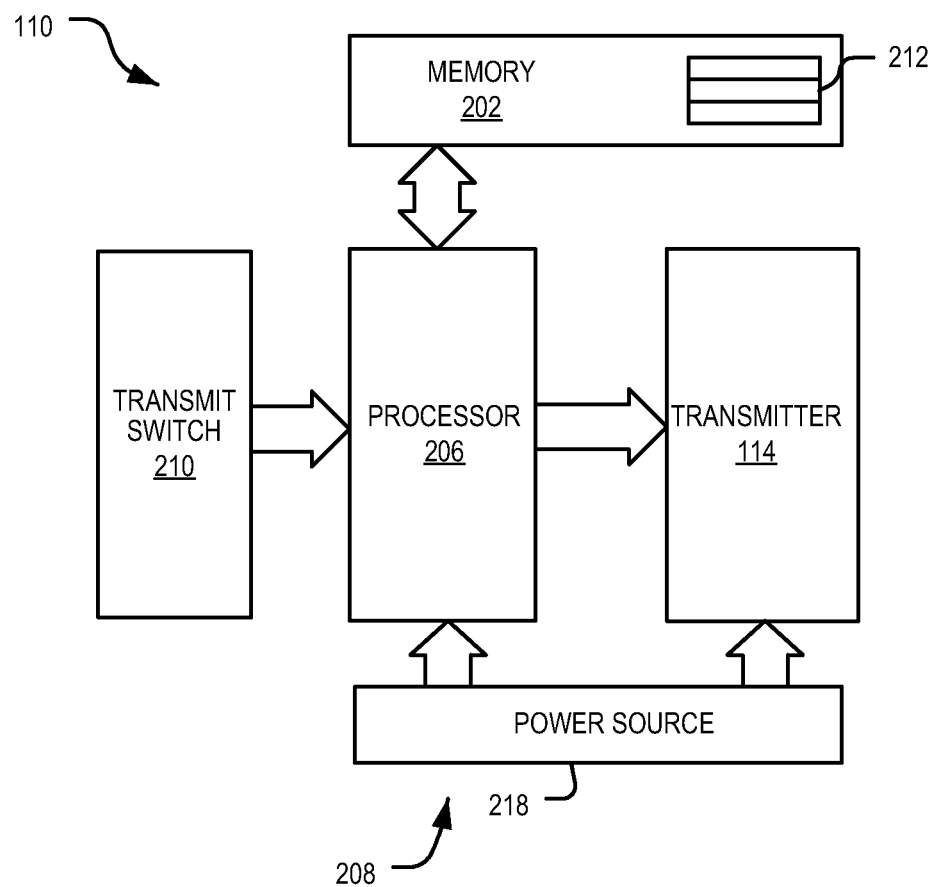
FIG. 2A is a block diagram of an embodiment of a portable user device suitable for use with the system of FIG. 1A.

A schematic overview of an example of a portable user device 110 is depicted in FIG. 2A. The illustrated portable user device 110 includes a wireless transmitter 114 that can be activated to transmit the communication signal 116 (ref. FIG. 1) into the wireless communications network 108. Since, in the present example, the wireless communications network 108 is a GSM PLMN, the wireless transmitter 114 will be compatible with that network 108 and a communications service provided by that network. However, it will be appreciated that in other embodiments the wireless transmitter 114 may be of a type that is compatible with the other types of wireless or wired communications network 108 into which the portable user device 110 communicates the communication signal 116.

In the embodiment illustrated the portable user device 110 also includes on-board memory 202 (for example, such as SRAM, Flash memory, ROM, or EPROM), a processor 206, and an internal power source 208. In the preset case the transmitter 114, the on-board memory 202 and the processor 206 are integrated on a single integrated circuit that provides computing functionality similar to that provided by a conventional mobile phone, for example, radio frequency (RF) management, power management and control functions. It is possible that the portable user device 110 may also include a smart card or "SIM" to provide user authentication, call charge credit and other applications.

Figure 2B:
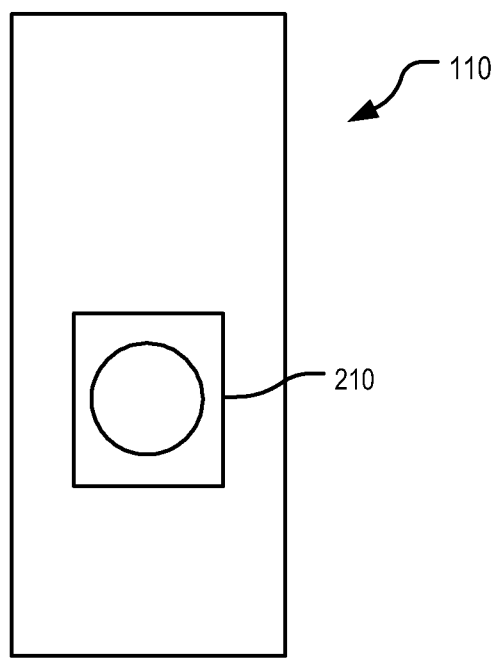
FIG. 2B is a front view of an embodiment of a portable user device.

Referring now to FIG. 2B, the portable user device 110 includes a switch 210 ('the transmit switch') which can be operated by the user 104 to activate the transmitter 114 to transmit the communication signal 116 into the wireless communications network 108. Ideally, the transmitter 114 is activated to transmit the communication signal 116 in response to a single press of the switch 210 so that the communication signal 116 can be transmitted with a minimum of actions on the part of the user 104. In this way, the transmitter 114 can be quickly activated by the user 104, which may be beneficial in circumstances where the user 104 would otherwise have difficulties in performing a more complicated action (for example, if the user 104 was injured).

Another example of a suitable portable user device 110 may include a mobile phone which has been programmed to provide a "hot-key" which dials a pre-set phone number associated with the communications management system 112. Suitable mobile phone devices would be known to a skilled reader.

Returning again to FIG. 2A, the on-board memory 202 stores program code (in the form of a set of instructions compiled from a suitable software programming language) that is executable by the processor 206 to provide the portable user device 110 with the necessary functionality. By way of example, the program code may include an operating system and executable code.

The on-board memory 202 may store one or more preprogrammed text messages 212, at least one of which may be retrieved from the on-board memory 202 on activation of the transmitter 114. Such a preprogrammed text message 212 may be used by the processor 206 to assemble a communication signal 116 (ref. FIG. 1) which includes a retrieved preprogrammed text message 212 which is intended for routing to a recipient as the alert message 102.

It is not essential that the portable user device 110 stores one or more preprogrammed text messages 212. However it is envisaged that a preprogrammed text messages may be helpful for communicating an alert message in circumstances in which the user 104 is unable to communicate verbally.

Although a preprogrammed text message 212 may be stored in on-board memory 202 of the communication device 110, it is also possible that the alert message 102 communicated to the recipient may include a preprogrammed text message 212 selected from one or more preprogrammed text messages 212 stored, or accessible to, the communications management system 112, as opposed to a preprogrammed text message 212 communicated to the communications management system 112 by the portable user device 110 itself. Thus, it will be appreciated that a preprogrammed text message 212, for inclusion in an alert message 102, may originate from either the portable user device 110 or the communications management system 112. Again, it will be appreciated that it is not essential that the alert message 102 include a preprogrammed text message 212, but as previously explained it is envisaged that a text message may provide advantages in certain circumstances. However, in a typical application the alert message 102 will be communicated as a voice communication.

Irrespective of whether the communication signal 116 or the alert message 102 is a voice communication or is assembled to include a preprogrammed text message 212, the communication signal 116 will include identification information associated with the user, such as a unique identifier that identifies, or that can be used to identify, the user 104 (ref. FIG. 1), the communications device 110, or the user's communications service.

Returning now to FIG. 1, the received identification information is processed by the communications management system 112 to select a recipient communications service associated with the identification information and thereafter establish a communications channel to communicate the alert message 102 to the selected recipient communications service. As explained above, the alert message 102 may be a preprogrammed alert message of the type described above, or it may be a message which is conveyed by the user 104 via voice communication.

In the present case, the identification information associated with the user 104 includes the CLI of a communications service associated with the user 104. However, the identification information could equally include a preprogrammed identification code, such as a text message 212, that has also been entered into the communications management system 112 (ref. FIG. 1) by the user 104, the recipient 106, or another person, using for example, a web-portal which is able to access and modify the configuration of the communications management system 112.

In either case, operation of the switch 210 results in the transmission of a signal into the communications network which contains identification information associated with the user 104. The signal is processed by the communications management system 112 to select a recipient communications service according to the identification information associated with the user 104 for receiving the alert message 102 via a communication channel established between the user device and the recipient communications service.

An alert message 102 that includes a preprogrammed text message 212 may include text that has been entered into the portable user device 110, or the communications management system 112, by the user 104, or the recipient 106 or another person, and may include, for example:

a. information that identifies a communications service associated with the user (for example, "Phone: 8555-5555");
b. medical information for the user (for example, "asthmatic");
c. identify information for the user (for example, "John Citizen").
d. message information (for example, "please call me immediately")

It will be appreciated that the above examples of preprogrammed text messages 212 are exemplary only and that other preprogrammed text messages 212 may be included. In this respect, it is to be appreciated that references to the term "preprogrammed text message" throughout this specification are to be understood to be a reference to any text message that has been programmed into the portable user device 110, or the communications management system 112, prior to the activation of the transmitter 114. Ideally, the preprogrammed text message 212 will be programmed into the portable user device 110, or the communications management system 112, well in advance of the activation of the transmitter 114.

A portable user device 110 of the type illustrated in FIG. 2A may be operable in at least two selectable modes of operation and is able to transmit a communication signal 116 that contains mode dependent information that varies according to the selected mode of operation. It is not essential that that the portable user device 110 provides selectable modes of operation. Nevertheless, in embodiments that provide multiple modes may provide further advantages. In one embodiment of a multiple mode device, the portable user device 110 stores a different preprogrammed text message 212 for each mode of operation, so that the communication signal 116 may include a preprogrammed text message 212 that identifies the mode of operation.

In a dual mode device 110, the mode of operation of the portable user device 110 may be indicative of the device location, and thus the location of the user 104 (when wearing the device 110). By way of example, if the user 104 is at "home", the portable user device 110 may be configured to operate in a "home mode" so that, on activation of the transmitter 114, the portable user device 110 transmits a communication signal 116 containing mode dependent information that identifies the user 104 as being located at home, or that simply identifies the mode of operation of the portable user device 110. Alternatively, if, for example, the portable user device 110 does not support voice communication, the mode dependent information may specify a communications service associated with the user 104 that should be used by the recipient 106 to make contact with the user 104 when the user is at home, and thus when the portable user device 110 is in the "home mode".

Similarly, if the user is at away from home the portable user device 110 may be configured to operate in an "away mode" so that, on activation of the transmitter, the portable user device 110 transmits a communication signal 116 containing mode dependent information that identifies the user 104 as not being located at home, or that identifies the mode of the portable user device 110. Alternatively, the mode dependent information may specify a communications service associated with the user 104 that should be used by the recipient 106 to make contact with the user 104 when the user 104 is away from home, and thus when the portable user device 110 is in the "away mode". As will be appreciated, the mode of the portable user device 110 may be controlled or configured using any suitable means, such as a "mode switch", or by way of a location tracking system that provides location data (such as a GPS system).

Figure 3A:
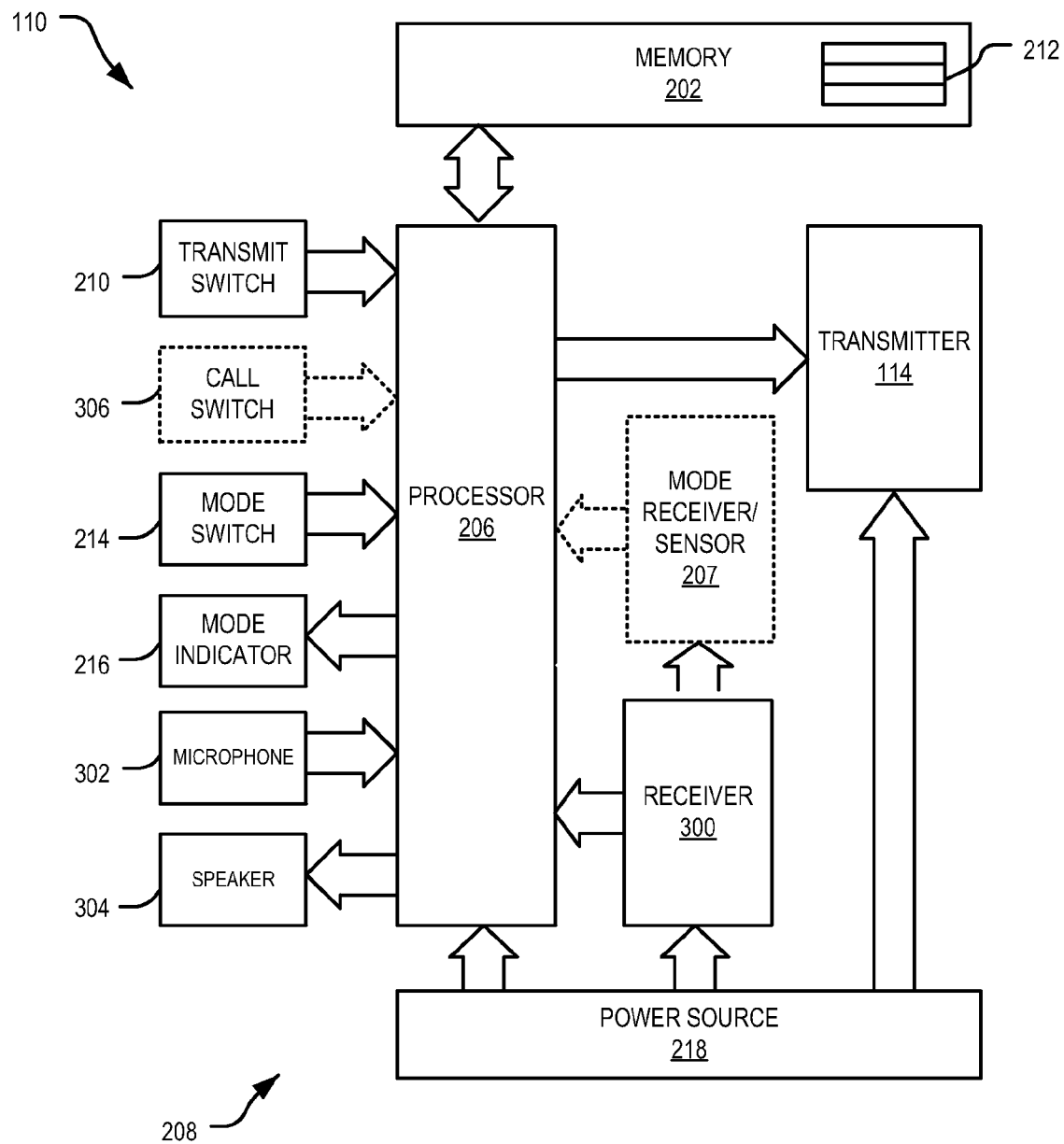
FIG. 3A is a block diagram of a portable user device according to another embodiment of the invention.

FIG. 3A shows a block diagram for a portable user device 110 that includes a mode switch 214 to permit switching of the device 110 between the plural modes. Ideally, the portable user device 110 also includes an indicator 216 (such as an LED indicator) for indicating to the user 104, for example, the selected mode of operation. As mentioned previously, the means for switching the portable user device 110 between the plural modes need not be limited to a physical switch and could equally comprise other, non-physical, switching means. For example, another embodiment of a portable user device 110 may include means for obtaining location information from a location information service (such as a global positioning system service), or for detecting the location of the portable user device 110, and means for automatically selecting the mode of operation of the portable user device 110 according to the location information. By way of example, another embodiment of a portable user device 110 according to the present invention may automatically switch to a "home mode" after obtaining GPS coordinates within a range of coordinates associated with a "home" location and may automatically switch to an "away mode" after obtaining GPS coordinates outside that range.

A sensing or communications device may be installed at the user's "home" location to detect the presence of the portable user device 110 at, or within a range of that location. For example, a wireless transmitter may be installed at the user's home location and configured to transmit a short range signal that is detectable by the portable user device 110. Any suitable wireless transmitter may be used. In this way, when the portable user device 110 is proximate to the wireless transmitter, and thus detects the short range signal, the portable user device 110 switches to a "home mode", whereas when the portable user device 110 is out of range of the wireless transmitter, and thus cannot detect the short range signal, the portable user device 110 switches to "away mode". As will be appreciated, the short range signal may include, for example, an infrared signal, or a radio frequency signal.

The portable user device 110 illustrated in FIG. 3A also includes an internal power source 208 which, in the illustrated embodiment, includes a conventional rechargeable battery 218 (for example, such as a lithium ion battery). The rechargeable battery 218 may be recharged using any suitable charging scheme. However, in the illustrated embodiment the rechargeable battery 218 is recharged by way of an inductive charging scheme. Accordingly, the portable user device 110 includes a coil (not shown) that is energised by an electromagnetic field produced by a charging circuit (not shown) so as to induce a charging voltage across the rechargeable battery 218. Thus, the coil is coupled to the rechargeable battery 218 by way of a suitable circuit so as to allow the charging voltage to be applied across the rechargeable battery 218 during recharging. In an embodiment, a charging circuit may be integrated with the above described sensing or communication device.

The portable user device 110 depicted in FIG. 3A also includes a receiver 300, a microphone 302, a speaker 304, a call switch 306 (shown dashed), and a mode receiver/sensor 307 (shown dashed).

Switch 306 is a "general call button" that, when pressed, causes the portable user device 110 to dial a predetermined phone number to set up a communications channel between a user 104 and a recipient 106 using the microphone 302 and the speaker 304. A portable user device 110 that includes a receiver 300, a microphone 302, a speaker 304 and a call switch 306 may permit 2-way voice communication between the recipient 106 and the user 104. It is also possible that the portable user device 110 shown in FIG. 3A may be configured so as to only permit the recipient 106, or designated recipients 106, to communicate with the portable user device 110 and thus exclude communication from others.

The designated recipients 106, or designated communications services associated with a recipient 106, may be identified to the communications management system 112 so that the portable user device 110 may only communicate with designated recipients or communications services.

Figure 3B:
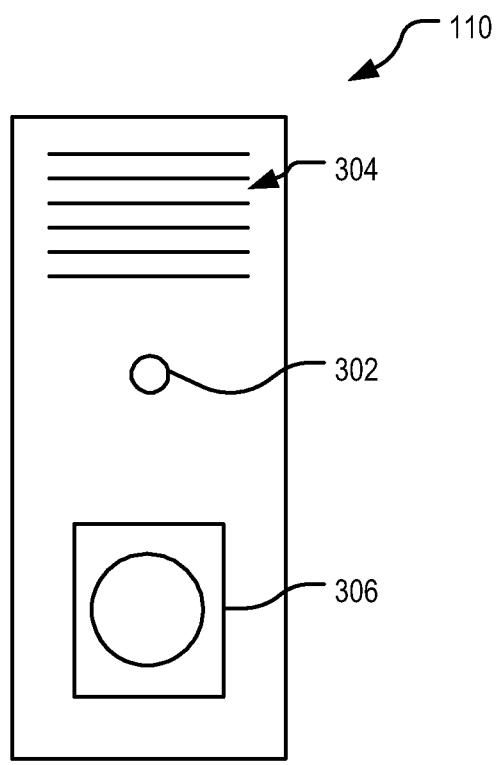
FIG. 3B is a front view of another embodiment of a portable user device.

FIG. 3B shows a front view a portable user device 110 that includes a microphone 302, a speaker 304, and a call switch 306. As will be appreciated, the depicted arrangement is exemplary and other arrangements may be used.

Figure 3C:
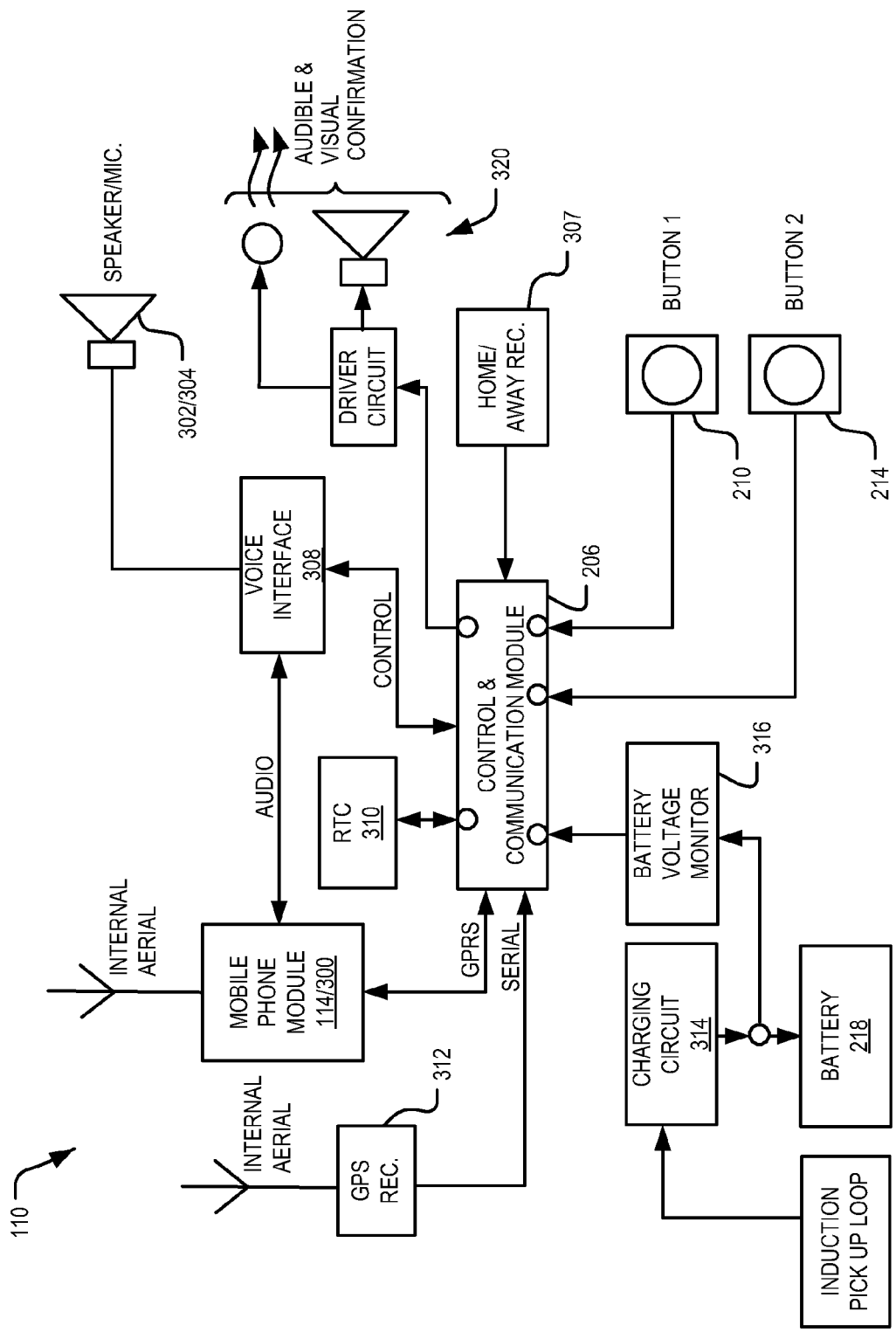
FIG. 3C is a functional block diagram of a portable user device in accordance with the embodiment depicted in FIG. 3A.

Turning now to FIG. 3C there is shown a functional block diagram of a portable user device 110 that provides further functionality over the portable user device 110 depicted in FIG. 3A. The portable user device 110 depicted in FIG. 3C includes a mobile phone module that incorporates transmitter 114 and receiver 300 functions, a GPS receiver 312 for providing GPS information to the processor 206 (shown as 'control and communication module') for establishing the user's 104 location, and a mode receiver/sensor 307 (shown as home/away proximity receiver) for sensing the user's 104 proximity to a wireless transmitter, such as may be provided in a charging base 412 (refer FIG. 4B) installed at the user's 'home' location to transmit a proximity signal 414 (refer FIG. 4B) for detection by the portable user device 110 to facilitate mode switching.

The portable user device 110 shown in FIG. 3C also includes voice interface electronics 308, real time clock/date 310, battery 218, battery charging control 314 and monitoring 316 modules, mode indication and alert devices 320.

Although not illustrated, another embodiment of the portable user device 110 may also include, or be connectable to, one or more sensing means for sensing respective biometric and/or physiological parameters of the user 104 and means for activating the transmitter 114 to transmit a communication signal 116 containing information identifying an alert condition in response to one or more of the sensed biometric and/or physiological parameters having a value that is indicative of an alert condition.

FIG. 4A shows a block diagram for another embodiment of a system 400 according to the present invention. The system is similar to the system 100 described earlier except that it includes an additional communications path between the recipient 106 and the user 104 via communications service 402. Communications service 402 may be a service of the wireless communications network 108 or it may be a separate service, such as an email service, a PSTN service, a different PLMN service, or the like. It is preferred that the communications service 402 be identified in the alert message 102 communicated to the recipient 106.

Figure 4B:
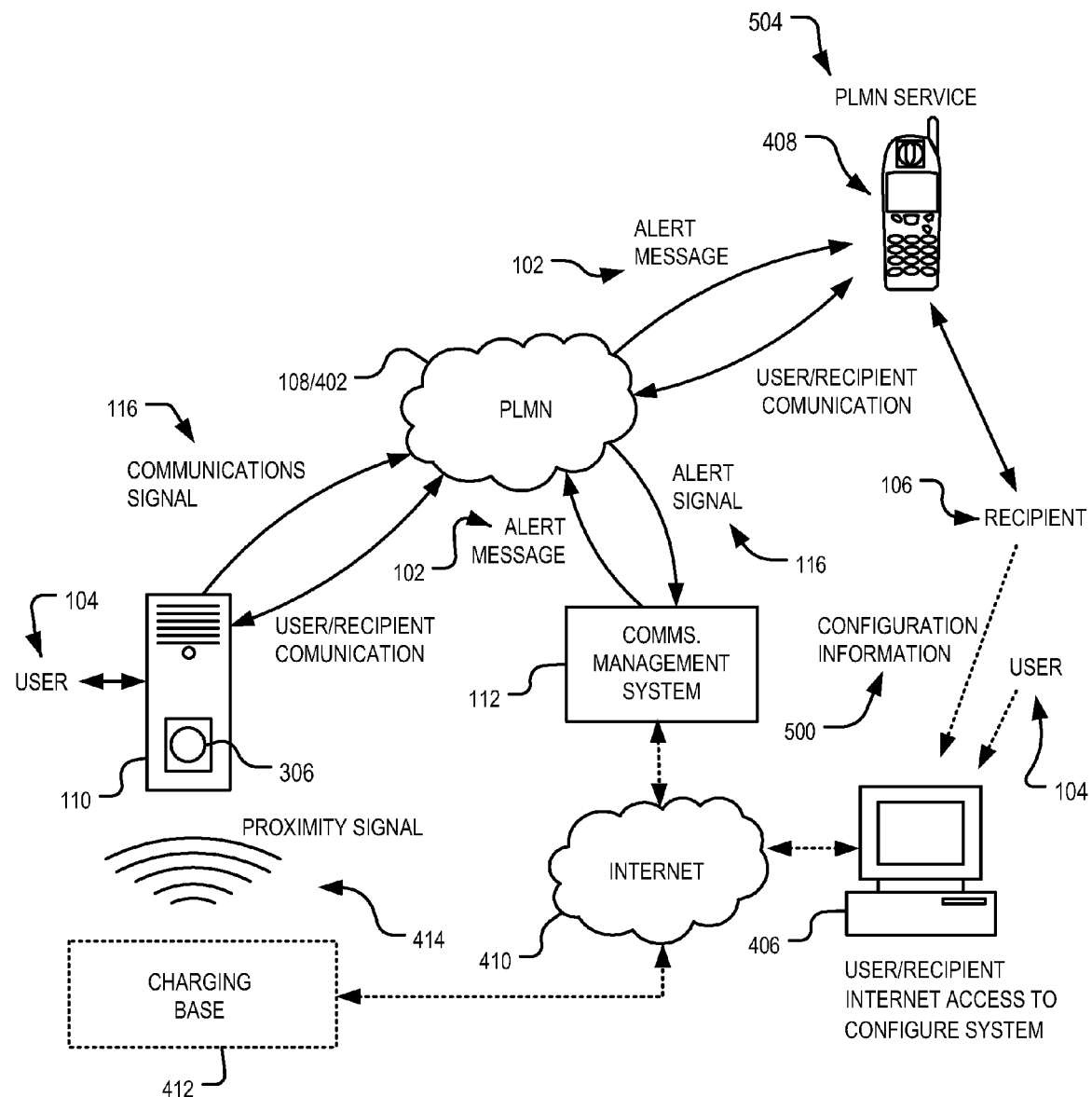
FIG. 4B is a lower level block diagram of the system depicted in FIG. 4A.

FIG. 4B shows an example of a system architecture which includes a communications management system 112 in the form of a network based service. The communications management system 112 receives the communication signal 116 via at least the wireless communications network 108 (shown in FIG. 4B as a PLMN) and thereafter communicates the alert message 102 to a recipient 106 associated with a communications service which has been selected based on identification information contained in the signal 116.

In the illustrated example, the communications management system 112 connects to the PLMN via a single ISDN link with incoming and outgoing traffic. In this example, the communications management system 112 requires two in-dial numbers, one to be used for voice calls, another for emergency calls. The depicted communications management system 112 also supports an SMS address, and is thus able to receive and transmit SMS messages, or the like.

In the embodiment shown in FIG. 4B, the recipient's 106 communication service is selected by the communications management system 112 by retrieving, based on the identification information, configuration information, such as rules, logic or ancillary information, provided to the communications management system 112 by the user 104, or the recipient 106, prior to the transmission of the communication signal 116.

The configuration information is supplied to the communications management system 112 by means of an interactive selection, or an upload process. In the present case, the illustrated communications management system 112 includes an interface 406 for accepting configuration information from the user 104 or the recipient 106 via a web-portal. The interface 406 includes a web-page that is accessible to the user 104 or the recipient 106 via a packet based communication network such as the internet using a desktop computer, a laptop computer, a hand held computer, a mobile phone or the like.

The configuration information 500 that can be accepted by the communications management system 112 preferably includes at least information that identifies one or more communications services 504 such as a PSTN service, a PLMN service or an email service or the like) associated with the recipient 106. It is preferred that a selected one of the communications services will be designated by the recipient 106, using the communications management system 112, as the communications service 504 that is to be used for communicating the alert message 116 from the communications management system 112 to the recipient 106.

Figure 5:
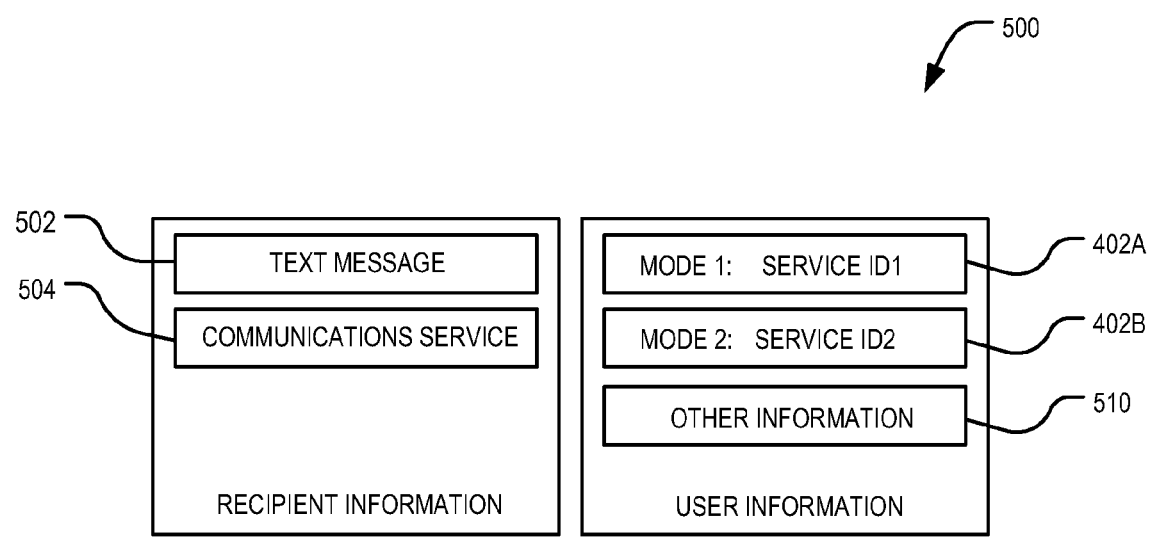
FIG. 5 is a table illustrating an example of configuration information that may be provided to a communications management system by a user or the recipient.

An example of the types of configuration information 500 that may be accepted by the communications management system 112 is shown in FIG. 5. In this example, information 502, 504 is associated with the recipient 106 and information 402A, 402B, 510 is associated with the user 102.

An embodiment that allows the recipient 106 to enter or nominate a particular communications service 504 to be used by the system 100 for communicating the alert message 116 to the recipient 106 is expected to provide significant flexibility in operation since it will allow the recipient 106 to modify the designated communications service 504 according to their movements. For example, when the recipient 106 is at home, the recipient 106 may designate their home PSTN service as the designated communications service 504, whereas when the recipient 106 is away they may designate a PLMN service as the designated communications service 504. Similarly, a user 104 may also have multiple communications services 402A, 402B that are available for designation.

Figure 6:
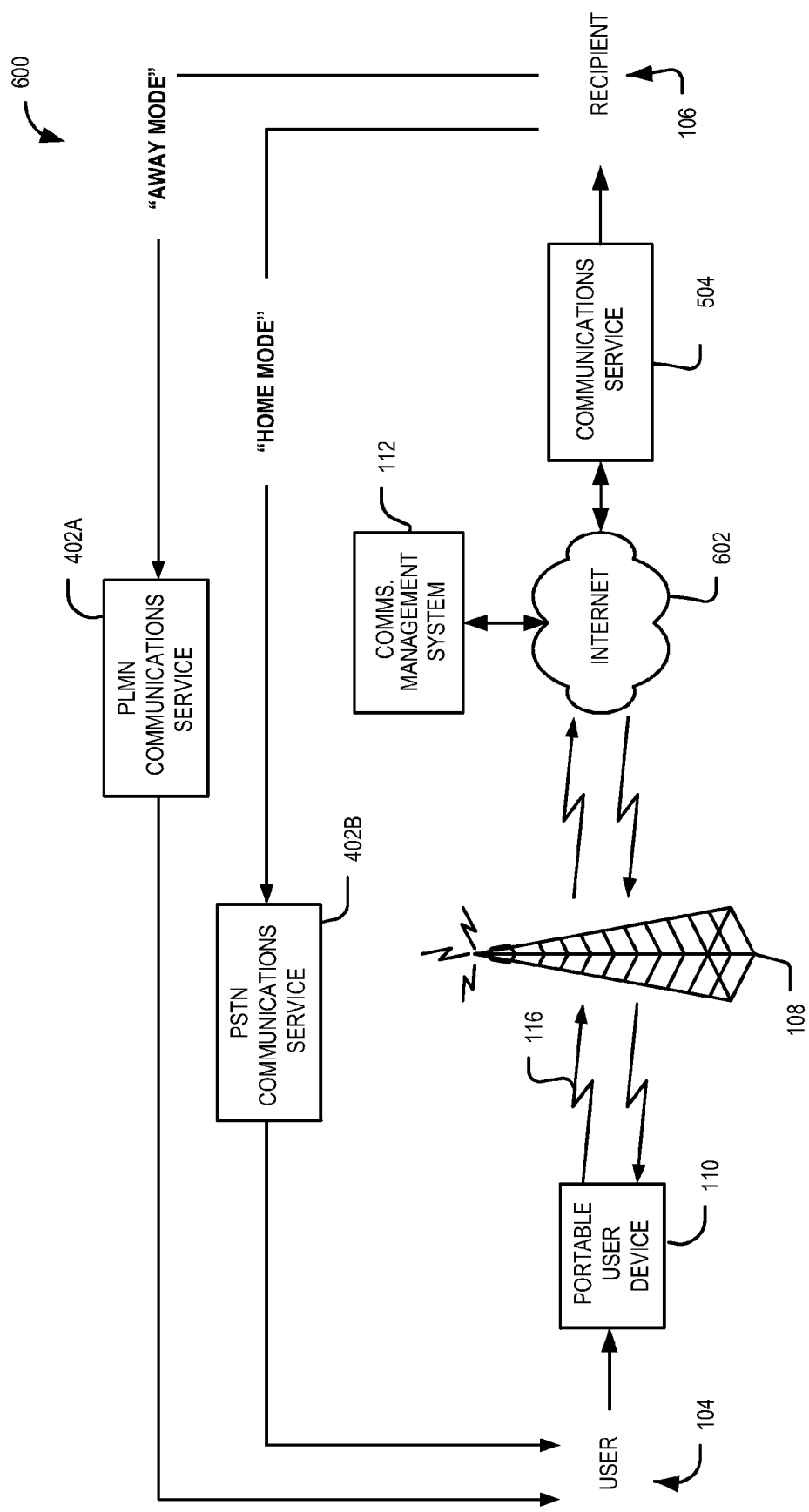
FIG. 6 is a block diagram of third embodiment of a system for communicating according to the present invention.

The communications management system 112 may also include other types of configuration information which is associated with either the user 104 or the recipient 106, such as, in the case of the user 104, medical information (for example, blood type, allergies, medical conditions and the like). In addition, and as is depicted in FIG. 6, the communications management system 112 may further include information that identifies one or more communications services 402A, 402B (such PSTN service, a PLMN service or an email service or the like) associated with the user 104 for communicating to the recipient 106 in the alert message 102. Thus, the recipient 106, and/or a user 104, may have multiple associated designated communications services 504, 402A, 402B.

In addition, in an embodiment of the present invention that includes a portable user device 110 that includes, or that is connected to, sensing means for sensing respective biometric parameters of the user 104, the communications management system 112 may store sensed biometric information for viewing by the recipient using the interface or for communicating to the recipient 106 in the alert message 102

Figure 7:
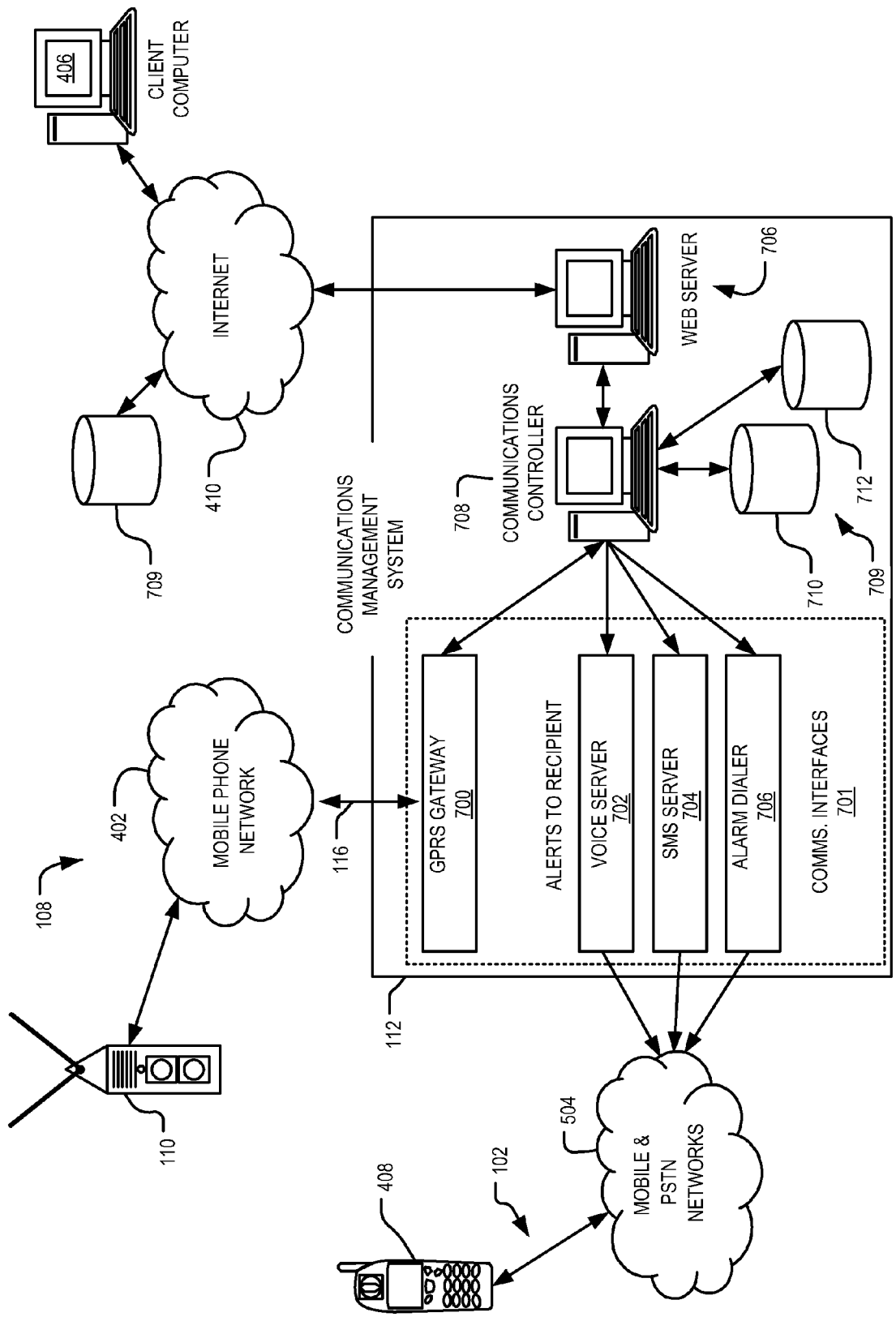
FIG. 7 is a lower level block diagram of the system shown in FIG. 6.

FIG. 7 shows, at a lower level, a block diagram for an embodiment of the system shown in FIG. 4B to assist with the explanation of example operations of that system in response to the activation of a communication signal 116 on the portable user device 110.

In the system depicted in FIG. 7, the communications management system 112 receives the communication signal 116 via GPRS gateway 700, and performs a pre-established procedure that results in the selection of a recipient communications service 504 according to configuration information provided to the communications management system 112 by the recipient 106 or the user 104 prior to the transmission of the communication signal 116. The pre-established procedure may result in the assembly of the alert message 102 for communicating to a recipient 106 via a selected communications service 504 or it may result in a 2-way communication channel between the device 110 and a recipient's device 408 via a selected communications service 504 which supports voice communication.

The selection of the recipient communication service 504 by the communications management system 112 may be performed using any suitable means and process. In the present case, the communications management system 112 includes a communications controller 708 equipped with suitable software (not shown) to enable the communications controller 708 to receive and process the communication signal 116 to identify the user 104 sending the communication signal 116.

In system embodiments that include a portable user device 110 having plural modes, the communications controller 708 may also decode the communication signal 116 so as to derive the mode of the portable user device 110.

As depicted in FIG. 7, having identified the user 104, the communications management system 112 then indexes user identification information (for example, a user number) for that user 104 into a database 709 which includes a data structure 710 containing configuration information for a plurality of different recipients 106 so as to select the particular recipient communications service 504 to which the alert message 102 is to be communicated.

The selection of the recipient communications service 504 involves identifying a recipient communications service having a predefined association with the identification information for the user 104. In the illustrated embodiment, the recipient communications service 504 will be a service which is compatible with a communications interfaces 701 of the communications management system 112, such as a voice server 702, an SMS server 704 or an alarm dialer 706 (such as, for example, an Ademco alarm dialer).

If the communication signal 116 included mode information, that information may also be indexed into the same data structure 710, or a different data structure 712, containing configuration information relating the mode information to ancillary information for the user 104 so as to retrieve, for example, information for a communications service 402 associated with the user 104 for the identified mode. In the present case, the communications service 402 has been illustrated as a PLMN service. However, as mentioned earlier, it is to be appreciated that the present invention is not to be limited to such a communications service.

In a system that supports multiple users 104, the data structures 710, 712 of the database 709 will contain information for plural users 104 and recipients 106, so that each user 104 has a predefined association with one or more respective recipient communications services 504. Having identified a particular communications service 504 associated with the user 104, the communications controller 708 then enables communication of the alert message 102.

As described previously, it is envisaged that communicating an alert message 102 may include assembling an alert message 102 containing a preprogrammed text message (from either the communications management system 112 or the portable user device 110 via communication signal 116). Such an alert message 102 may also include such other information that is available to the communications management system 112, such as location information for the user 104, medical information for the user 104 and the information that identifies a communications service 402 associated with the user 104, and which should be used by the recipient 106 to make contact with the user 104. In other embodiments, the alert message 102 may be communicated via a voice channel established between the user device 110 and a recipient device 408 via the selected recipient communications service 504.

EXAMPLE 1

Communication of a Text Alert Message Containing Communication Service Information With reference to FIG. 4A, a typical operation of the system 400 depicted in FIG. 4B to communicate to a selected recipient an alert message containing communication service information for the user, may involve the following steps:
1. Switch 210 (ref. FIG. 2A) of the portable user device 110 is activated by user 104;
2. Portable user device 110 transmits communication signal 116 into communications management system 112 via wireless communications network 108. The communication signal 116 contains identification information that identifies the communications service 402 associated with the user 104, such as the CLI;
3. The communications management system 112 receives communication signal 116.

4. The communications management system 112 processes the communication signal 116 and, based on the identification information, selects a recipient communications service 504 for receiving an alert message 102 in accordance with configuration information entered into, or accessible to communications management system 112, prior to the activation of the switch 210.
5. The communications management system 112 then assembles an alert message 102 based on the configuration information and communicates the assembled alert message 102 via the selected recipient communications service 106. The alert message 102 contains information identifying a communications service 402 associated with the user 104 and may also include other information, such as text describing the nature of the alert. If the user device 110 does not support voice communication, the communications service 402 may be a service which is available to the user 104 to receive calls;
6. The recipient 106 receives the alert message 102 and contacts user 104 via an identified communications service 402.

EXAMPLE 2

Communication of a Mode Dependent Text Alert Message

With reference to FIG. 6, operation of the illustrated system 600 to communicate a mode dependent alert message may involve the following steps:
1. Switch 210 (ref. FIG. 2) of the portable user device 110 is activated by user 104;
2. The portable user device 110 transmits communication signal 116 to the communications management system 112 via a wireless communications network 108 and a networked computer system, such as the internet 602. The communication signal 116 contains information that identifies the mode (for example, "home" mode, or "away" mode) of the portable user device 110 at the instant the communication signal 116 was transmitted.
3. The communications management system 112 receives communication signal 116 via wireless communications system 108 and the internet 602.
4. The communications management system 112 processes the communication signal 116 and, using the mode information, identifies a communications service 402A (if in "away" mode), 402B (if in "home" mode) associated with the user 104;
5. The communications management system processes configuration information for the recipient 106 and selects a recipient communications service 504 having a predefined association with the user 104 for receiving an alert message 102;
6. The communications management system 112 assembles alert message 102 and communicates the alert message 102 to the recipient 106 via the communications service 504. The assembled alert message 102 includes information identifying the communications service 402A, 402B associated with the user 104.
7. The recipient 106 receives the alert message 102 and contacts user 104 via the identified communications service 402A or 402B.

EXAMPLE 3

Establishing a Communication Channel Between the User and the Recipient via a Selected Recipient Communications Service The following example outlines an example application of the operation of the portable user device 110 of the type depicted in FIG. 3B, when used with a system of the type shown in FIG. 4B. In this example, the system establishes a 2-way voice communication channel between the user device 110 and a recipient device 408 via a recipient communication service which has been selected based on identification information for the user 104.

Turning initially to FIG. 4B, when the user presses button 306, the portable user device 110 transmits a signal into the communication network (PLMN) 108 which initiates a call to the communications management system 112 and which contains identification information associated with the user 104.

The communications management system 112 processes the call and selects a recipient communications service 504 (for example, by identifying a mobile telephone number of the recipient 106 based upon the CLI of the call from the user 104) and establishes a communication channel with that service via the ordinary public network 108.

As explained previously, a recipient communications service 504 having a predefined association with the user 104 (which in this example is a mobile phone service) is stored in the communications management system 112 and may be modified via a web portal 406. Secondary numbers may also be provided to prevent the possibility of a further diversion. In this respect, a signalling flag can be set by the communications management system 112 to indicate not to divert the call such as to a message-bank service.

In the present example, plural portable user devices 110 can be supported with each of the portable user devices 110 being programmed with the same phone numbers for the communications management system 112.

The voice connection provides for voice communication of an alert message such as "The Doctor called today, and I am OK", or "The game finished early, so please pick me up now". Such a function could be also involve the provision of a time supervision period by the communications management system 112 such as a maximum call duration, such as 30 seconds. If provided, the time supervision may be configurable so that different durations may be defined for different recipients 106.

When the user 104 presses the switch 306, because there is an emergency situation, the portable user device 110 will initiate a call to the communications management system 112 which processes the call and redirects the call to the selected recipient communication service 504 through the associated public network, or another network, to the recipient 106. Simultaneously, the user device 110 may generate a message (for example, an SMS message) addressed to the communications management system 112, with the location information determined by the GPS system in the portable user device 110. In such a case, on receipt of the call (with the incoming number indicating an emergency call), the communications management system 112 then expects to receive a further message with GPS location information. It also anticipates that a call to an emergency service may be required, which may require the provision of a third-party conference bridge. Again, all contact numbers can be modified via a portal to the web site by an authorised recipient 106 or user 104.

When the recipient 106 receives a voice call, a communication channel is established between a receiving device 408 of the recipient 106, the user device 110 and the communications management system 112.

It is possible that on receiving the call, the receiving device 408 signals an audio tone, or other signal, indicating that the incoming call is an emergency call. The audio tone, or other signal, may be pre-programmed into the receiving device 408, or it may be communicated to that device with the alert message. The recipient 106 can then speak with the user 104 via the two-way voice channel.

After receiving the call, the recipient 106 may determine that an emergency situation exists, and so activate the receiving device 408 to respond with a tone, or other signalling information, (for example, by pressing "0" or any button) that will be detected the communications management system 112 via the communication channel.

The communications management system 112 will then extend the connection to a third-party connection with the user 104, recipient 106 and, for example, an emergency service. The third-party connection may be selected based on the action of the recipient 106 and using response information 806 obtained by indexing a database 709 (refer. FIG. 7) to select a third party 808.

The recipient action will typically involve the recipient pressing a button on the keypad of their communications device 408, such as their mobile phone. For example, if the "0" button is pressed by the recipient 106 the third-party may be a "000" service. Alternatively, if the "1" button is pressed, the third-party may be a doctor. It will of course be appreciated that any service may be associated with other entities or services, such as a hospital, fire-brigade, ambulance service, an advice or counselling service, such as a poison advice service, a drug advisory service, a trauma counselling service, a child health advisory service or the like.

Once the third-party connection is established, the user 104 or the recipient 106 can advise the third-party 808 of the situation and, in the case of the recipient 106 advising the third-party 808, can arrange for the necessary actions to be initiated on behalf of the recipient 106, with the user 104 hearing the communications. GPS location data may also be forwarded to the third-party via a suitable communications infrastructure.

Thus an aspect of the present invention involves a call redirection process in which the communications management system 112 identifies the user 104 via the CLI (A-Party number) delivered with the call and then redirects the call to a recipient communication service 504 for a recipient 106 in accordance with a predefined association between the user 104 and the recipient communication service 504 contained in the database 709. Thus, during processing of the call, the database 709 containing data structures 710/712 relating identification information (such as the CLI) with communications services 504 associated with one or more recipients 106 are indexed using the CLI, to identify a recipient 106 communications service 504 (in other words, a communications service associated with the recipient), and the alert message 102 is sent to that destination.

Figure 9B:
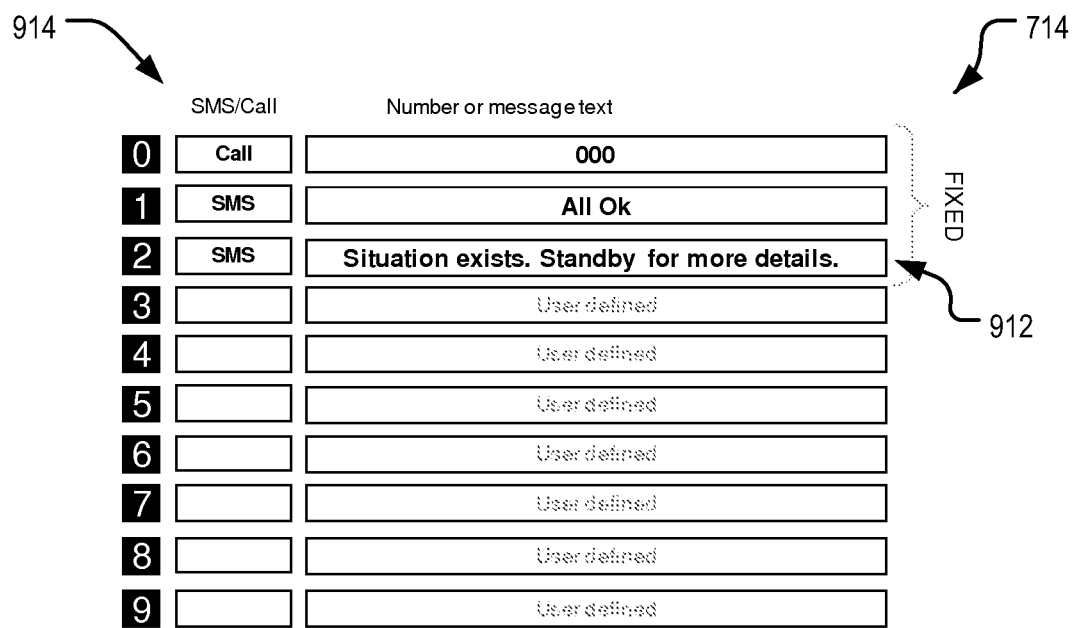

Examples of suitable data structures are depicted in FIG. 8, FIG. 9A and FIG. 9B. Data structure 710 (ref. FIG. 9) contains an entry 902-1, 902-2, 902-3, 902-4, 902-5 for each subscribing user 104 (defined by the CLI of the portable user device 110, and also includes the number(s) 904 of the communications services for each recipient 106 associated with the identification information of the user 104 and an indication of the sequence 906 in which each to be contacted. The data structure 710 also defines a maximum duration 908 for attempting to establish a voice call with a selected recipient 106. In this respect, if the a voice call is not established with a recipient 106 within the associated duration the communications management system 112 will then endeavour to establish a voice call with the next recipient in the sequence 906.

Data structures 710, 714 also includes information for further communications services for communicating a further message to one or more of the recipients 106. The communication of the further signal may be invoked by the communications management system 112 either on receipt of the signal 116 containing the identification information, or in response to further signalling information from either the recipient 106 or the user 104. In the present case, the further message is automatically communicated to all recipient communications services 504 associated with the identification information to indicate, for example, that the user device 110 has been activated and an alert message 102 has been communicated to a selected recipient 106. The further message could include information identifying the selected recipient communications service 504, or the selected recipient 106, so that on receipt of the further message a recipient of that message is able to ascertain who is acting on, or handling, the alert message.

Communication of the further message to one or more other recipient communication services may be triggered in response to an action of the recipient 106 of the alert message 102. By way of example, the recipient 106 of the alert message 102 may activate a communication device 408 to cause the communications management system 112 to communicate a further message, such as message 912 (ref. FIG. 9B) indicating the status of the response to the alert message 102. A suitable action may include, for example, the recipient 106 activating the communication device 408 to generate a DTMF signal onto the communications channel which is decodable by the communication management system 112 as a request to communicate the further message.

The communications management system 112 references the decoded information into a user segment of the database 709, such as data structure 714 (ref. FIG. 9B) containing configuration information and identifies the type 914 (ref. FIG. 9B) of the further message associated with the decoded information. The communications management system 112 then arranges communication of the further message to one or more other recipient communications service(s).

Advantageously, the content of the database 709, and thus the data structures 710, 712, 714 may be administered by a recipient 106, with access via the web or the like.

EXAMPLE 4

Automatic Generation of an Alert Signal

Some embodiments may provide the capability to automatically generate an alert signal without a positive action on the part of the user 104. With reference to FIG. 4B, the following examples of alert conditions that may result in the automatic transmission of a communication signal 116:

1. Whenever the portable user device 110 is in 'charging mode' (that is, whenever the portable user device 110 is seated in the charging base 412) a message is sent to the communications management system 112. An alert condition is generated, and thus an alert message 116 transmitted, automatically if the portable user device 110 is not in charging mode by a specified time, for example, failure to charge by 7:00 AM will generate an alert message to the recipient.
2. If the portable user device 110 battery charge level falls below a minimum level, an alert condition will be generated and the portable user device 110 will transmit an alert message 116 that informs the recipient of the low battery level.
3. Periodically (for example, hourly) the communications management system 112 polls the portable user device 110 for a response. If a valid reply is not received after a specified number of attempts (for example, after 5 subsequent attempts in 1 minute intervals) an alert condition results, and the portable user device 110 transmits an alert message 116 to the recipient.

4. The portable user device 110 may include an in-built movement detection system. An alert condition may be generated in response to the detection of no movement, and perhaps another condition. For example, an alert condition may be generated if no movement is detected and the portable user device is not in 'charging mode'. In such a state, transmission of the communication signal 116 may be preceded by a warning tone, such as a thirty second warning tone, to enable the user to cancel the alert condition.

EXAMPLE 5

Extending a Communications Channel to a Third Party

A further example will now be described with reference to FIG. 10 which depicts, in more detail, an embodiment of the system which is suitable for 3-way communications channel. In this example, the recipient 106 accesses the database 709 to populate a unique segment of a data structure associated with the user 104 (shown here as the 'A-party') to include, for example:

The A-Party mobile number (in other words, the phone number of the portable user device);
The B-Party details in the unique segment of the data base;
Billing details for the service;
The list of B-Party numbers in the unique segment of the data base corresponding to the guardian group; and
The 'rules' or 'logic' in the unique segment for finding an available member of guardian group (for example, linear hunting)

Although this example relates to an application in which the recipient 106 populates the database 709, it will be appreciated that the invention need not be so limited. For example, in other embodiments the user 104 may be provided with access to the database 709 which permits the user 104 to populate the database 709 and thus the data structure.

After the system has been configured, the user 104 is able to activate the communication device 110 by "pressing" a button to initiate dialling of the particular phone number of the communications management system 112. In this example, the communication device 110 includes a single "button" which is pre-programmed to "speed-dial" the designated phone number.

Figure 10:
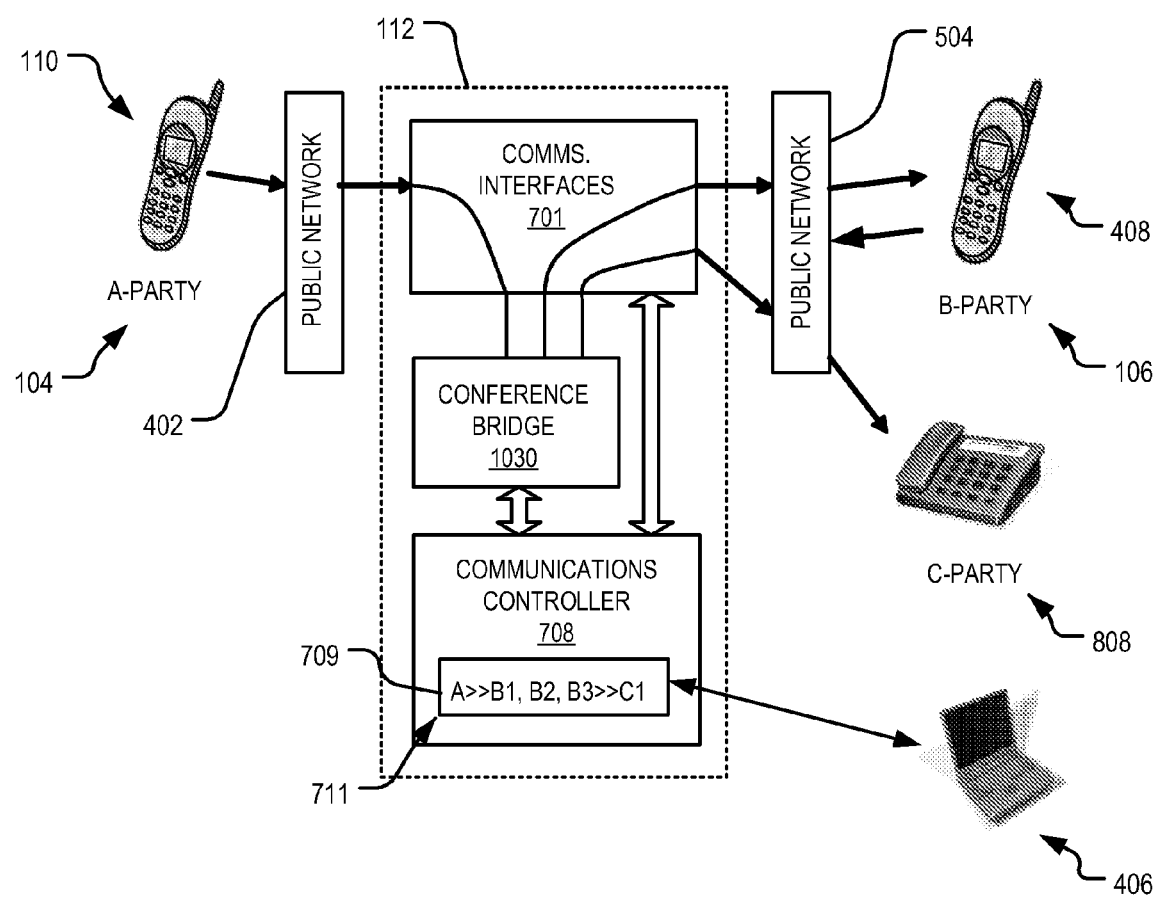
FIG. 10 is a system block diagram for a system in accordance with another embodiment.

The communications management system 112 shown FIG. 10 includes a communications controller 708 and communications interfaces 701 which are each separate from the communication networks 402, 504 providing the communications services for the A-Party 104 and the B-Party 106 respectively. In other embodiments, the communications controller 708 and the communications interfaces 701 may be implemented on an intelligent network (IN) within the communication network 108 (ref. FIG. 1) and the communication device 110 is pre-programmed with a phone number which is recognised by the communication network 108 to be routed to the IN which will then handle the call and subsequent call management.

The communications controller 708 receives the A-Party 104 call and from the identity of the A-Party 104 from the CLI (Calling Line Identification), authenticates the A-Party 104 before proceeding.

In this example the data base 709 contains a data structure which identifies all of the valid A-Party 104 numbers. The database 709 also contains a data structure relating each A-Party 104 with a list of numbers (that is, communications services) associated with recipients for the A-Party 104, and 'rules' 711 for contacting those services.

The communications controller 708 redirects an authenticated A-Party 104 call to the B-Party 106 number associated with a selected recipient communications service according to the rules 711 (for example, linear hunting) set and stored in the database 709. By way of example, an A-Party 104 call may be sequentially redirected (using a hunting sequence) to each B-party 106 in the list, stopping at the first B-Party 106 in the list that "live" answers the call in the hunting sequence.

The "hunting sequence" will be set up in a unique segment of the data base 709. In this example, the communications controller 708 is configured to prevent a second call diversion which may include, for example, a network based answering machine (voicemail).

The answering B-Party 106 then talks to the A-Party 104 regarding the concern that led to the call via the communication channel established between the selected recipient communications service 504 and the communications device 110 of the A-Party 104. Depending on the A-Party's 104 communication device 110, the B-party 106 may have access to an indicator of the location of the A-Party 104, as previously explained.

During the call, the B-Party 106 may decide to activate a three-party "conference call" with a third party 808 (shown here as "C-Party"). An advantage of the present invention is that the communication channel may be extended to a third-party without any discernable interruption in the connection between the A-Party 104 and the B-Party 106. Alternative third parties (that is, alternative C-Parties) will be entered into a data-structure of the database 709 so that activation of the B-Party's communication device (for example, a single button press by the B-Party 106) extends the communications channel to a pre-established C-Party 808 so that neither the A-Party 104 or the B-Party 106 are required to manually dial the number.

The alternative C-Parties 808 are entered into the database 709 by the user 104 or the recipient 106 using a web-portal 406 which permits interaction with a configuration environment which permits the user 104 or the recipient 106 to modify the configuration information associated with the identification information of the user 104 or the recipient 106.

In this example, extending the communication channel to a C-Party 808, is achieved by a B-Party 106 button press generating a DTMF signal that is detected and decoded by the communications management system 112. Thus, in this example the communications management system 112 includes a signal detecting means for detecting, after the communications channel has been established, a further communication signal, in the form of a DTMF signal, containing signalling information which is decodable as a request to extend the communication channel to a second communications service associated with a third-party 808. In the present case, the signal detecting means is a DTMF decoder.

In response to decoding the DTMF signal the communications controller invokes a 'conference bridge' 1030 and calls the C-Party 808 corresponding to the data base 709 entry corresponding to the decoded DTMF signal (that is, the number pressed by the B-Party 106).

Through call re-arrangement, the communications controller 708 routes the C-Party 808 into the conference bridge 1030 together with the A-Party 104 and B-Party 106. Although in this example the conference bridge 1030 is invoked after the B-Party 106 has generated a DTMF signal, it is to be appreciated that in other embodiments the conference bridge 1030 may be invoked with every connection of the A-Party 104 to the B-Party 106.

It will of course be appreciated that the above example applications are exemplary.

A system according to an embodiment of the present invention may provide significant flexibility in operation and capability, for example:

1. The communications management system 112 may also insert a message on the voice path to the recipient 106, for example, "The caller is located at <suburb>". Such a message may be inserted base on GPS information, or other location information, provided to the communications management system 112 by the portable user device 110.
2. Voice message activation may be prioritised: since message delivery may not be immediate, voice connections may established prior to communication of an alert message;
3. If the user 104 is unable to speak, the recipient 106 will still be able to instruct emergency services; and
4. Communications management system 112 calls may not have time supervision applied by the communications management system 112.

System Configuration

In terms of configuring the system, it is envisaged that each portable user device 110 will be packaged with a web address and a unique identifier (such as a number or password).

With reference now to FIG. 8, a recipient 106 will then access the communications management system 112 and enter into the data structure 712 the "A-Number associated" 802 with the SIM card, replace a password 804, and enter a corresponding recipient number. As explained previously with reference to FIG. 9, provision may be made for plural recipient numbers to be entered, plus an indication of which sequence the recipient numbers should be applied. Using this approach, the recipients can access their data via a Web portal or operator and modify the calling sequence according to their circumstances and availability.

Communications Management System Implementation

The communications management system 112 may be implemented using hardware, software or a combination thereof and may be implemented in one or more computer systems, apparatus or processing systems. In particular the functionality of the communications management system 112 may be provided by one or more computer systems forming a communications platform capable of carrying out the above described functionality.

One example of a suitable platform for a communications management system 112 is a modularised PBX and telephony platform which provides an open source PBX telephony engine and a telephony applications toolkit. One example of a suitable platform is the Asterisk® open source PBX & Telephony open source telephony engine and tool kit. Such a platform may be configured as the core of an IP or "hybrid PBX" supporting functions such as:

Call handling functions for receiving, switching and sending of calls over IP, and/or digital connections to the PSTN;
Making the necessary in-call rearrangements for 3-Party calls;
Managing routes;
Call detail records for billing of calls outgoing from the platform which will include the call to the B-Party and to the C-Party; and
SMS Messaging for the sending and receiving of alert messages, and GPS data.

Figure 11:
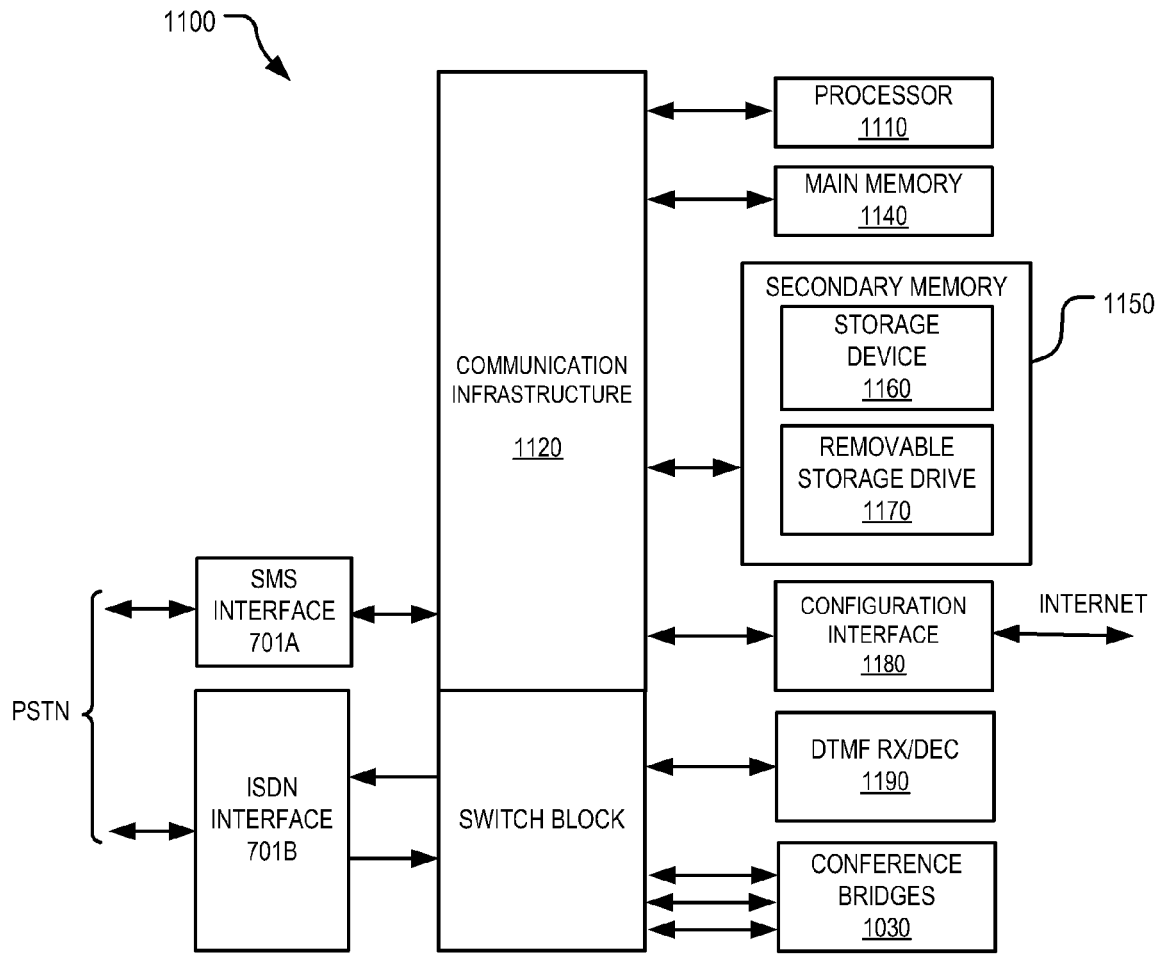
FIG. 11 is a schematic diagram depicting various functional components of a communications platform forming part of an embodiment of the present invention

An exemplary architecture for an exemplary communications platform 1100 suitable for a communications management system 112 is shown in FIG. 11. The platform 1100 includes system software and one or more processing units, such as processing unit 1110. The processing unit 1110 is connected to a communications infrastructure 1120. The processing unit 110 may include a bank of fault tolerant multiple processors.

The platform 1100 also includes communications interfaces 701A, 701B for interfacing with communications infrastructure of the communications network 108 (ref. FIG. 1). An example of a suitable communications network interface includes ISDN Primary Rate Interfaces 701B for connection to PCM30 links to/from the public network and a DTMF receiver and decoder (DTMF RX) for the receipt of third-party call instructions from the B-Party according to the user segment of the data base.

The platform 1100 may also include a main memory 1140, preferably random access memory, and a secondary memory 1150.

The secondary memory 1150 may include, for example, an installed storage device 1160 such as a hard disc drive, an optical disc drive, RAM, ROM, EPROM, EEPROM, or, or any other medium which can be used to store desired information, such as information contained in the data structures 711/712. The storage device 1160 stores therein computer software in the form of a series of instructions to cause the processing unit 1110 to carry out desired functionality. In alternate embodiments, secondary memory 1150 may include other similar means for allowing computer programs or instructions to be loaded into the computer 1100. Such means may include, for example, a removable storage unit (such as a universal serial bus drive) and an associated interface.

The removable storage drive 1170 reads from and/or writes to a removable storage unit (not shown), such as a CD-ROM, or DVD in a well known manner.

The platform 1100 also includes a configuration interface 1180. The configuration interface 1180 allows software and data to be transferred between the platform 1100 and external devices, and may include a wired or wireless communications interface. By way of example, a suitable configuration interface 1180 may include a modem, a network interface (such as an Ethernet interface), or the like. The configuration interface 1180 will preferably support Internet access for entry of configuration information by the user or recipients from a Web interface.

Software and data transfer via the configuration interface 1180 may be in the form of signals which may be electronic, electromagnetic, optical or other signals capable of being received by the configuration interface 1180. The signals are provided to configuration interface 1180 via a suitable communications path such as by wire or cable, fibre optics, phone link, cellular phone link, radio frequency or other communications channels.

Conference bridges 1030 provide the previously described functionality to extend a communications channel to a third party.

DTMF RX/DEC 1190 provides the previously described functionality to detect, after the communications channel has been established, a further communication signal containing DTMF signalling information requesting that a communications channel be extended to a second communications service, or requesting communication of a further message.

It will be understood that there may be other variations and modifications to the configurations described herein that are also within the scope of the present invention.

The invention claimed is:

1. A communications management system for handling communication between a user and a plurality of recipients associated with the user, the communications management system including:
   a communications network interface for interfacing with a communications network, the interface for receiving a communication signal transmitted into the communications network by a communications device activated by the user, the communication signal including the unique user identifier previously received by the communications device from the user;
   a communications controller for
      processing the communication signal to obtain the unique user identifier,
      accessing user information based on the unique user identifier from the communication signal, the user information including an identification of a plurality of potential recipients associated with the user,
      attempting to establish a first communications link over a public communications network with at least one recipient of the plurality of potential recipients via a communications service associated with each of the potential recipients,
   establishing the first communications link with an active recipient, the active recipient being a recipient of the plurality of potential recipients with whom the first communications link is first established,
   establishing a second communications link over the public communications network or a further public communication network with the communication device activated by the user via a communications service associated with the user,
   providing an active communications link for two-way verbal communication between the user and the active recipient via the first communications link and the second communications link, and
   transmitting a one-way communication message to remaining recipients of the plurality of recipients with whom the active communication link was not established, the one-way communication message identifying the active recipient and providing a status of an alert message received by the active recipient.

2. A system for communicating between a user and a first recipient, the system including:
   the communications management system of claim 1; and
   a portable user device, to be worn or carried by the user, the user device configured to receive the unique user identifier,
   the user device including a wireless transmitter that, when activated, transmits the communication signal including the unique user identifier into a wireless communications network.

3. A system according to claim 2 wherein the portable user device includes a mobile phone.

4. A system according to claim 2, wherein the portable user device includes input means allowing the user to enter location information into the device, and wherein the communication signal includes the location information.

5. A system according to claim 2, wherein the portable user device includes means for switching the portable user device between a first mode and a second mode, wherein in the first mode, on activation of the transmitter, the communication signal contains location information that identifies the user as being located at a first location and in the second mode, on activation of the transmitter, the communication signal contains location information that identifies the user as not being located at the first location.

6. A system according to claim 5 wherein the means for switching includes a first switch operable by the user to switch the mode of the device between the first mode and the second mode.

7. A system according to claim 5 wherein the portable user device includes an indicator for indicating the mode of the portable user device to the user.

8. A system according to claim 2, wherein the portable user device includes means for switching the device between plural modes, each mode configuring the portable user device so that, on activation of the transmitter, the communication signal contains information identifying a particular communications service corresponding to the mode.

9. A system according to claim 2, wherein the portable user device includes a receiver for wirelessly receiving location information from a location information service, and wherein the communication signal transmitted by the portable user device includes the location information.

10. A system according to claim 9 wherein the location information service includes one of:
   a. a global positioning system (GPS) service; or
   b. a cellular network information service.

11. A system according to claim 2 wherein the portable user device further includes:
   a. one or more sensing means, each sensing means for sensing a respective biometric parameter of the user; and
   b. means for activating the transmitter to transmit the communication signal in response to one or more of the sensed biometric parameters having a value that is indicative of an alert condition.

12. The communications management system of claim 1, wherein the communication signal includes location information for identifying a location of a user device and wherein the communications management system communicates the location information to the active recipient.

13. The communications management system according to claim 1, wherein the communication signal contains information identifying an alert condition.

14. The communications management system according to claim 1, wherein the communications management system includes an interface for accepting configuration information from the user or the first recipient.

15. The communications management system according to claim 14 wherein the interface includes a web-page.

16. The communications management system according to claim 14 wherein the configuration information includes a contact telephone number for the first recipient.

17. The communications management system according to claim 14 wherein the configuration information further includes medical information, some or all of which is included in an alert message transmitted to at least one of the plurality of potential recipients.

18. The communications management system of claim 1, wherein the communications control further establishes a second active communication link with a third-party via a communications service associated with the third party, and provides for three-way verbal communication between the user, the active recipient, and the third party via the first communication link and the second active communication link.

19. The communications management system according to claim 18 further including a database including the predetermined activation information in association with respective third-party communications services.

20. The communications management system of claim 1, further including a database containing data structures including predefined associations of the unique user identifier with each of the plurality of recipients.

21. The communications management system of claim 1, wherein the data structures further include predefined associations of a communication service associated with each potential recipient of the plurality of potential recipients.

22. The communications management system of claim 1, wherein the communications controller establishes the first communication link with the active recipient according to configuration information provided to the communications management system prior to receipt of the communication signal.

* * * * *